US007475234B2

United States Patent
Suzuki

(10) Patent No.: US 7,475,234 B2
(45) Date of Patent: Jan. 6, 2009

(54) ELECTRONIC CONTROL APPARATUS EQUIPPED WITH MALFUNCTION MONITOR

(75) Inventor: Shinya Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 357 days.

(21) Appl. No.: 11/054,314

(22) Filed: Feb. 10, 2005

(65) Prior Publication Data

US 2005/0187681 A1 Aug. 25, 2005

(30) Foreign Application Priority Data

Feb. 10, 2004 (JP) ............................ 2004-033933
Feb. 10, 2004 (JP) ............................ 2004-034013
Apr. 9, 2004 (JP) ............................ 2004-115977

(51) Int. Cl.
*G06F 9/00* (2006.01)

(52) U.S. Cl. .......................................... 713/1; 713/100

(58) Field of Classification Search .................... 713/1, 713/100

See application file for complete search history.

(56) References Cited

U.S. PATENT DOCUMENTS 5,575,265 A 11/1996 Kurihara et al.
6,556,901 B2 4/2003 Sugimura et al.
6,630,749 B1 10/2003 Takagi et al.
2002/0057683 A1* 5/2002 Poulter et al. ............... 370/386
2003/0093189 A1* 5/2003 Honda ........................... 701/1

FOREIGN PATENT DOCUMENTS

JP 59-049350 3/1984
JP 1-193067 8/1989
JP 8-35452 2/1996
JP 2001-151047 A 6/2001
JP 2001-243082 9/2001
JP 2002-14720 1/2002
JP 2002-14726 1/2002
JP 2002-371907 12/2002
JP 2003-139874 5/2003
JP 2003-214246 7/2003
JP 2003-254172 9/2003

OTHER PUBLICATIONS

Decision of Rejection issued on Feb. 26, 2008 in corresponding JP Application No. 2004-034013 with at least a partial English-language translation.
Japanese Office Action mailed Jul. 3, 2007 in Application No. 2004-034013 together with an English translation.

* cited by examiner

*Primary Examiner*—Tse Chen
(74) *Attorney, Agent, or Firm*—Nixon & Vanderhye P.C.

(57) ABSTRACT

An electronic control apparatus is provided which is equipped with a timer-activated function and a timer diagnosis function. The apparatus is designed to retain the fact that a host microcomputer has been activated upon expiry of time measured by a timer as a history record in the timer. This improves the reliability of diagnosing a malfunction of the timer.

5 Claims, 25 Drawing Sheets

ELECTRONIC CONTROL APPARATUS EQUIPPED WITH MALFUNCTION MONITOR

CROSS REFERENCE TO RELATED DOCUMENT

The present application claims the benefit of Japanese Patent Application No. 2004-33933 filed on Feb. 10, 2004, Japanese Patent Application No. 2004-34013 filed on Feb. 10, 2004, and Japanese Patent Application No. 2004-115977 filed on Apr. 9, 2004, disclosures of which are incorporated herein by reference.

BACKGROUND OF THE INVENTION

1. Technical Field of the Invention

The present invention relates generally to an electronic control apparatus equipped with a timer-activated function which may be employed in automotive vehicles to perform a given task such as a fuel vapor leakage check upon activation of a timer during an off-state of an ignition switch, and more particularly to such an electronic control apparatus designed to monitor or diagnose a malfunction of a timer.

2. Background Art

Typical automotive engine control systems are designed to be activated by electric power supplied upon turning on of the ignition switch. However, in recent years, the need has arisen for initiating a given task at some specific time during an off-state of the ignition switch. Typical of such a task is a fuel vapor leakage check in an evaporative purge system (also called an evaporative emission control system) of automotive vehicles. The evaporative purge system is a system for avoiding the escape of fuel evaporative emissions or fuel vapors from a vehicle's fuel system to the atmosphere. For example, Japanese Patent First Publication No. 8-35452 discloses a typical evaporative purge system which works to adsorb fuel vapors in an adsorbent of a canister and siphon the fuel vapors from the canister into an intake pipe of the engine together with fresh air drawn from an air inlet of the canister to purge the canister in accordance with operating conditions of the engine.

If holes or cracks occur in the fuel tank or an evaporative emission path between the fuel tank and the canister, it may cause the fuel vapors to be released into the atmosphere without being adsorbed in the canister. In order to avoid air pollution arising from such a malfunction of the evaporative purge system, the fuel vapor leakage check is made to monitor a leak of the fuel vapors from the fuel system of the vehicle.

The fuel vapor leakage check may be achieved by keeping the evaporative purge system closed hermetically by a solenoid valve and measuring a variation in pressure within the evaporative purge system using a pressure sensor. A leakage check of this type may, however, have a difficulty in diagnosing the malfunction of the evaporative purge system correctly after a long period of high load engine running because of increased ease of evaporation of the fuel. This problem may be eliminated by activating a host microcomputer of an engine control ECU a preset period of time after the ignition switch is turned off to carry out the leakage check.

The above system requires a timer circuit such as a soak timer for measuring the preset period of time after the ignition switch is turned off. For example, Japanese Patent First Publication No. 2003-254172 teaches an engine control ECU with a soak timer. However, if any problem arises in the timer circuit, it will result in a difficulty in checking the fuel vapor leak, thus requiring accurate monitoring of an operating status of the timer circuit. Japanese Patent First Publication No. 2003-139874 discloses a monitoring system for timer circuits.

The operating status of the soak timer may be diagnosed by saving an activation history record indicating the fact that the host microcomputer has been activated after a lapse of a period of time measured by the soak timer in a standby RAM (i.e., SRAM) built in the host microcomputer, checking the presence or absence of the activation history record in the SRAM upon subsequent activation of the host microcomputer upon turning on of the ignition switch, and analyzing a count value of the soak timer, as sampled upon the subsequent activation of the host microcomputer.

The above method may, however, encounter a difficulty in writing the activation history record in the SRAM correctly upon activation of the host microcomputer by the soak timer if an operating voltage supplied to the host microcomputer has dropped below a lower limit required to write data in the SRAM correctly. This will result in an error in diagnosing a malfunction of the soak timer.

SUMMARY OF THE INVENTION

It is therefore a principal object of the invention to avoid the disadvantages of the prior art.

It is another object of the invention to provide an electronic control apparatus equipped with a timer-activated function which is designed to diagnose a malfunction of a timer correctly.

According to one aspect of the invention, there is provided a vehicle electronic control apparatus equipped with a timer-activated function and a time malfunction monitor. The apparatus comprises: (a) a microcomputer working to control a device mounted in a vehicle; (b) a first power supply circuit operable to supply operating power to the microcomputer in response to input of an on/off signal switchable between an on- and off-state, upon input of the on/off signal in the on-state, the first power supply circuit starting to supply the operating power, upon input of the on/off signal in the off-state, the first power supply circuit stops supplying the operating power; (c) a timer circuit including a register and a counter, the register storing therein a set value, the counter designed to start counting when the on/off signal is switched to the off-state, when a count value of the counter reaches the set value stored in the register, the timer circuit outputting a power supply on-signal to activate the first power supply circuit to supply the operating power to the microcomputer; and (d) a second power supply circuit working to supply operating power to the timer circuit at all times. When the first power supply circuit supplies the operating power to the microcomputer in response to the power supply on-signal outputted from the timer circuit, the microcomputer performs a given task and alters the set value as stored in the register of the timer circuit.

Specifically, the microcomputer work to alter the set value stored in the register as a timer-activated history record indicating the fact that the microcomputer has been activated upon expiry of the time measured by the counter and use it in diagnosing the timer circuit.

In the preferred mode of the invention, after the microcomputer alters the set value as stored in the register of the timer circuit, the timer circuit prohibits the power supply on-signal from being re-outputted.

The microcomputer may alter the set value to outside a counting range of the counter to prohibit the power supply on-signal from being re-outputted.

The counter may be designed to start counting when the on/off signal is switched to the off-state and stop counting when the count value reaches a given limit.

The timer circuit may monitor the set value in the register to determine whether the set value has been altered by the microcomputer or not. If the set value is determined to have been altered, the timer circuit prohibits the power supply on-signal from being re-outputted.

When activated by supply of the operating power from the first power supply circuit upon the input of the on/off signal in the on-state, the microcomputer may compare the count value read out of the counter with the set value read out of the register to determine whether the timer circuit is malfunctioning or not.

The microcomputer may work to control an engine of the vehicle and also to diagnose a fuel vapor purge system as the given task.

According to the second aspect of the invention, there is provided an electronic control apparatus which comprises: (a) a first power supply circuit supplied with a battery voltage from a battery to produce a source voltage at all times; (b) a second power supply circuit supplied with the battery voltage from the battery to output a source voltage when one of two conditions is met: 1) a power supply switch is turned on, and 2) a power supply signal is in an active level; (c) a timer circuit which operates on the source voltage from the first power supply to perform counting, the timer circuit producing the power supply signal which has one of the active level and a passive level, the active level being established when the second power supply circuit is in a condition to stop outputting the source voltage, and a count value of the timer circuit reaches a set value; (d) a microcomputer which operates on the source voltage as produced by the second power supply circuit, the microcomputer being activated upon input of the source voltage from the second power supply circuit in response to input of the power supply signal having the active level to the second power supply circuit from the timer circuit, the microcomputer being operable to perform an activation cause identification task, an activation history recording task, malfunction detecting task, when the microcomputer has been activated by the source voltage supplied from the second power supply circuit, the microcomputer initiating the activation cause identification task to determine whether current activation of the microcomputer is achieved following turning on of the power supply switch or output of the power supply signal having the active level from the timer circuit, when the activation cause identification task determines that the current activation is achieved by the timer circuit, the microcomputer initiating the activation history recording task being to store a timer-activated history according a memory and also controlling the timer circuit to keep the power supply signal in the active level to continue output of the source voltage from the second power supply circuit until a given task executed by the microcomputer is completed, alternatively, when the activation cause identification task determines that the current activation is achieved by the power supply switch, the microcomputer initiating the malfunction detecting task to whether the timer circuit is malfunctioning or not based on the timer-activated history record stored in the memory and the count value of the timer circuit; and (e) a resetting block which resets the count value of the timer circuit to an initial value when the battery voltage drops below a set value that is greater or equal to a voltage at which the microcomputer has a difficulty in storing the timer-activated history record in the memory.

In the preferred mode of the invention, the timer circuit may be so designed that when the source voltage produced by the first power supply circuit drops below a minimum operating voltage level which allows the timer circuit to operate normally, the count value is reset to the initial value. When the battery voltage decreases to the set voltage, the resetting block inhibits the source voltage from being supplied from the first power supply circuit to the timer circuit to reset the count value of the timer circuit.

The resetting block may work to decrease the source voltage supplied from the first power supply circuit to the timer circuit below the minimum operating voltage to reset the count value when the battery voltage decreases to the set voltage.

According to the third aspect of the invention, there is provided an electronic control apparatus which comprises: (a) a first power supply circuit supplied with a battery voltage from a battery to produce a source voltage at all times; (b) a second power supply circuit supplied with the battery voltage from the battery to output a source voltage when one of two conditions is met: 1) a power supply switch is turned on, and 2) a power supply signal is in an active level; (c) a timer circuit which operates on the source voltage from the first power supply to perform counting, the timer circuit producing the power supply signal which has one of the active level and a passive level, the active level being established when the second power supply circuit is in a condition to stop outputting the source voltage, and a count value of the timer circuit reaches a set value; (d) a microcomputer which operates on the source voltage as produced by the second power supply circuit, the microcomputer being activated upon input of the source voltage from the second power supply circuit in response to input of the power supply signal having the active level to the second power supply circuit from the timer circuit, the microcomputer being operable to perform an activation cause identification task, an activation history recording task, a malfunction detecting task, when the microcomputer has been activated by the source voltage supplied from the second power supply circuit, the microcomputer initiating the activation cause identification task to determine whether current activation of the microcomputer is achieved following turning on of the power supply switch or output of the power supply signal having the active level from the timer circuit, when the activation cause identification task determines that the current activation is achieved by the timer circuit, the microcomputer initiating the activation history recording task being to store a timer-activated history record in a memory and also controlling the timer circuit to keep the power supply signal in the active level to continue output of the source voltage from the second power supply circuit until a given task executed by the microcomputer is completed, alternatively, when the activation cause identification task determines that the current activation is achieved by the power supply switch, the microcomputer initiating the malfunction detecting task to whether the timer circuit is malfunctioning or not based on the timer-activated history record stored in the memory and the count value of the timer circuit; (e) a detecting block which functions to detect a fact that the source voltage to be supplied from the second power supply circuit to the microcomputer drops to a set value that is higher in level than a voltage at which the microcomputer has a difficulty in storing the timer-activated history record in the memory; and (f) an activation inhibiting block which functions to inhibit the microcomputer from performing the activation history recording task, terminating the current activation of the microcomputer, and resetting the count value of the timer circuit when the detecting block detects the fact that the source voltage to be supplied from the second power supply circuit to the microcomputer drops to the set value upon activation of the microcomputer to start to operate in response to the power supply signal having the active level provided from the timer circuit to the second power supply circuit.

According to the fourth aspect of the invention, there is provided an electronic control apparatus which comprises: (a) a controller functioning to perform a given task; (b) an on/off state monitor working to monitor an on/off state of a start switch; (c) a soak timer working to count; (d) a relay designed to be turned on to supply electrical operating power from a battery to the controller to activate the controller when one of a first condition where a count value of the soak timer has reached a set value and a second condition where the on/off state monitor has monitored turning on of the start switch is met; (e) a timer stop block functioning to stop the soak timer counting when the first condition is met; and (f) a diagnosis block functioning to sample a count value of the soak timer when stopped by the timer stop block and use the sampled count value in diagnosing a failure of the soak timer.

In the preferred mode of the invention, the electronic control apparatus may further comprise a nonvolatile memory which stores the count value of the soak timer, as sampled when the soak timer is stopped, as an activation timer count. When the second condition is met to activate the controller, the diagnosis block samples a current count value of the soak timer and makes a comparison between the sampled current count value and the activation timer count to determine whether the soak timer is failing in operation or not.

When the second condition is met to activate the controller, the diagnosis block may also make a comparison between the set value in the soak timer and the activation timer count to determine whether the soak timer is failing in operation or not.

The electronic control apparatus may further comprise a second nonvolatile memory in which an activation history flag indicating a fact that the controller has been activated is stored every time the first condition is met to activate the controller. The diagnosis block may perform the comparison between the sampled current count value and the activation timer count when a condition where the activation history flag is stored in the second nonvolatile memory is met.

When the second condition is met to activate the controller, the diagnosis block may sample a current count value of the soak timer and makes a comparison between the sampled current count value and the set value in the soak timer to determine whether the soak timer is failing in operation or not.

The diagnosis block may perform the comparison when a condition where the activation history flag is not stored in the second nonvolatile memory is met.

The soak timer may include the timer stop block. The soak timer may work to compare the count value with the set value to determine whether the first condition is met or not and stop counting through the timer stop block when it is determined that the first condition is met.

The timer stop block may be activated in response to a timer stop request signal provided from outside the soak timer.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(*b*) is a time chart which represents ignition- and timer-activated operations of the ECU of FIG. 1 when any problem has arisen in a timer circuit;

FIG. 10(*b*) is a time chart which represents ignition- and timer-activated operations of the ECU of FIG. 6 when a timer circuit is operating normally, and a write inhibit signal in a logical low level upon activation of the ECU by the timer circuit;

DESCRIPTION OF THE PREFERRED EMBODIMENTS

Figure 1:
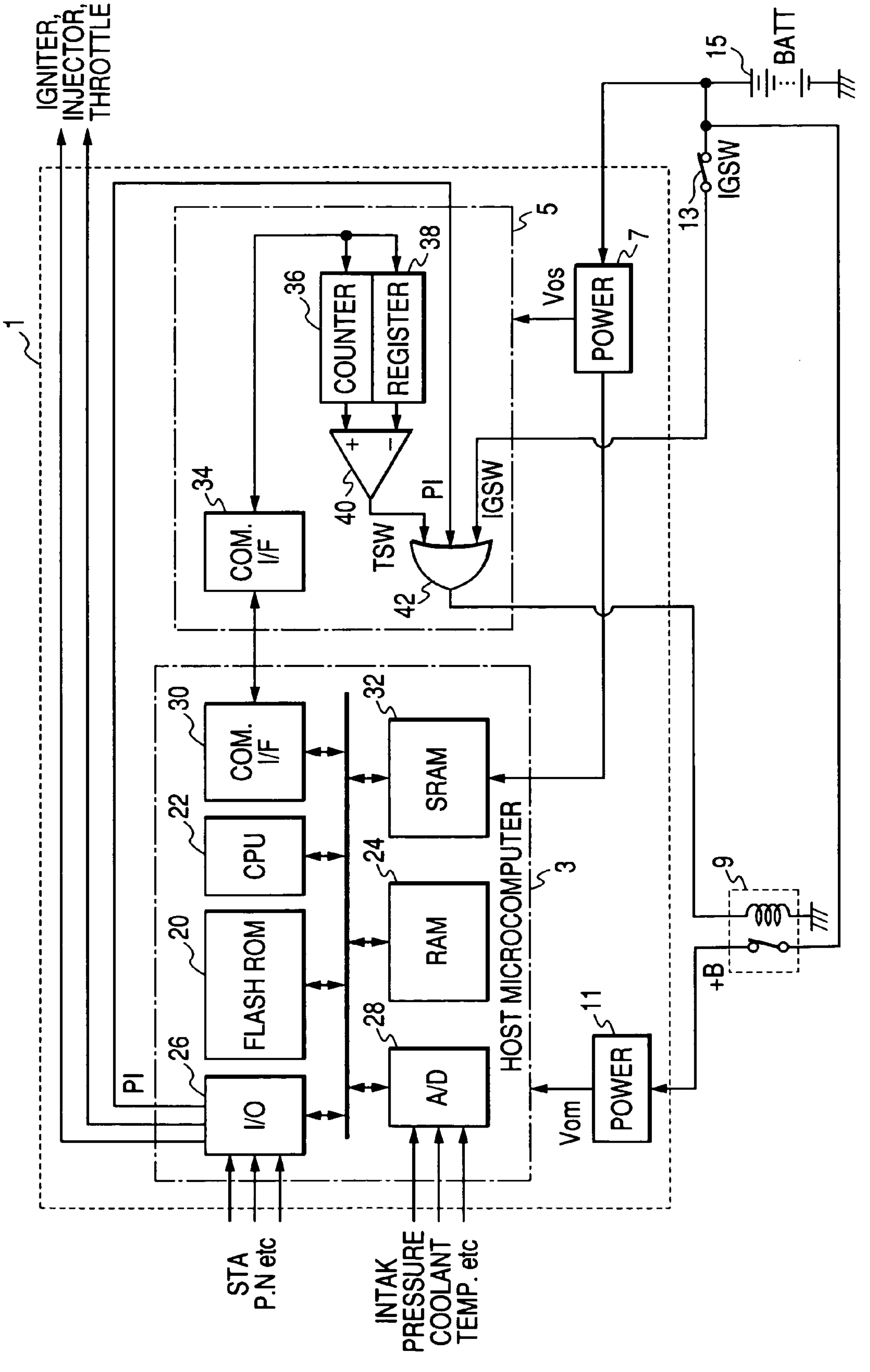
FIG. 1 is a block diagram which shows an engine electronic control unit (ECU) equipped with a timer-activated function according to the first embodiment of the invention.

Referring to the drawings, wherein like reference numbers refer to like parts in several views, particularly to FIG. 1, there is shown an engine electronic control unit (ECU) 1 according to the first embodiment of the invention which is mounted in an automotive vehicle.

The engine ECU 1 consists essentially of a host microcomputer 3, a timer circuit 5, and power supply circuits 7 and 11. The host microcomputer 3 works to perform arithmetic, logic, and decision-making operations to control an operating condition of an engine of the vehicle. The timer circuit 5 works to count the time elapsed since the host microcomputer 3 is deactivated following turning off of an ignition switch (IGSW) 13 of the vehicle. The power supply circuit 7 works to provide an operating voltage Vos of 5V to the timer circuit 5. The power supply circuit 11 works to provide an operating voltage Vom of 5V to the host microcomputer 3.

The power supply circuit 5 is supplied with a battery voltage VB at all times from a storage battery 15 mounted in the vehicle and operable to convert it into the operating voltage Vos which is, in turn, outputted to the timer circuit 5 and a volatile memory (SRAM) 32 of the host microcomputer 3.

The timer circuit 5 may be implemented by a soak timer and is used to determine the time when a fuel vapor leakage check, as will be described later in detail, should be initiated. Specifically, the timer circuit 5 includes a counter 36, a register 38, a comparator 40, an OR circuit 42, and a communication I/F 34. When required to be turned off following the turning off of the ignition switch 13, the host microcomputer 3 outputs a timer ON signal to the timer circuit 5. The counter 36 is responsive to the timer ON signal so start counting from an initial value. The register 38 stores therein a set value which is to be compared with a count value shown by the counter 36 to determine whether a given period of time has expired or not since the ignition switch 13 has been turned off, that is, the host microcomputer 3 was required to be turned off and outputted the timer ON signal.

The counter 36 and the register 38 connect with the comparator 40. The comparator 40 compares the count value of the counter 36 with the set value, as stored in the register 38. When the count value reaches the set one, the comparator 40 outputs a power supply signal TSW of a high level to a coil of a main relay 9 through the OR circuit 42 to turn on or close contacts of the main relay 9. This causes the battery voltage VB to be given to the power supply circuit 11 through the main relay 9. The power supply circuit 11 produces and outputs the operating voltage Vom to the host microcomputer 3. The timer circuit 5 is designed to count, for example, up to five (5) hours.

The timer circuit 5 has, as described above, the communication I/F 34 for establishing communication with the host microcomputer 3. Specifically, the timer circuit 5 receives the timer ON signal to start the counter 36 and the set count to be altered and stored in the register 38 from the host microcomputer 3 through the communication I/F 34. The timer circuit 5 also outputs the count value, as counted by the counter 36, and the set count, as retained in the register 38, to the host microcomputer 3 through the communication I/F 34.

To the OR circuit 42, an ignition on/off signal IGSW transmitted from the ignition switch 13 as indicating an on- or off-state thereof and a power hold signal PI produced by the host microcomputer 3 are inputted in addition to the power supply signal TSW from the comparator 40. Therefore, when any one of three conditions is met: (1) the power supply signal TSW of the high level is outputted from the host microcomputer 3, (2) the ignition switch 13 is placed in the on-state, and (3) the power hold signal PI of high level is outputted from the host microcomputer 3, it will cause the main relay 9 to be energized to close the contacts thereof.

The host microcomputer 3 includes a nonvolatile memory 20 such as a flash ROM, a CPU 22, a volatile memory 24 such as a RAM, an I/O port 26, an A/D converter 28, a communication I/F 30, and a volatile memory 32 such as a standby RAM. The memory 20 stores therein control programs. The CPU 22 works to execute the control programs stored in the memory 20 to control the engine and perform an evaporative purging operation and a fuel vapor leakage check, as will be described later in detail. The memory 24 retains therein results of the operations, as executed in the CPU 22, temporarily. The I/O port 26 works to receive an engine starter signal STA, a gear position signal indicative of a gear position, as selected in an automatic transmission, etc., and output control signals to ignition and fuel injection systems. The A/D converter 28 works to convert sensor outputs indicative of an intake air pressure of the engine, the temperature of coolant of the engine, etc. into digital signals for use in the controls, as executed in the CPU 22. The communication I/F 30 works to establish communication with the timer circuit 5. The memory 32 stores therein learning control data used in the control of the engine.

The learning control data include, for example, a learned value of a correction factor for use in bringing an air-fuel ratio of a mixture to be sprayed into the engine close to the stoichiometric air-fuel ratio and a learned value of a sensor output correction factor for use in correcting errors in outputs of sensors arising from aging thereof. Such learned values are updated each run of the vehicle using the outputs of the sensors and conditions of controlled objects such as the engine, etc., retained in the memory 32 temporarily, and outputted to the memory 20 upon request. The volatile memory 32 continues to be supplied with the operating voltage Vos from the power supply circuit 7 to retain the learned values also after the supply of the operating voltage Vom from the power supply circuit 11 to the host microcomputer 3 is cut.

Upon start to operate on the voltage Vom from the power supply circuit 11, the host microcomputer 3 outputs the power hold signal PI of nigh level to the OR circuit 42 to keep the operating voltage Vom outputted from the power supply circuit 11. When it is determined that a given operation stop requirement has been met, the host microcomputer 3 changes the power hold signal PI to the low level to stop the supply of the operating voltage Vom from the power supply circuit 11 to deactivate itself.

The operation stop requirement is met when a given operation has been completed following turning off of the ignition switch 13 in a case where the host microcomputer 3 has been turned on by the ignition switch 13 or when a timer-activated operation such as a fuel vapor leakage check in an evaporative purge system has been completed in a case where the host microcomputer 3 has been activated following a change in the power supply signal TSW to the high level in the timer circuit 5 during the off-state of the ignition switch 13.

Figure 2:
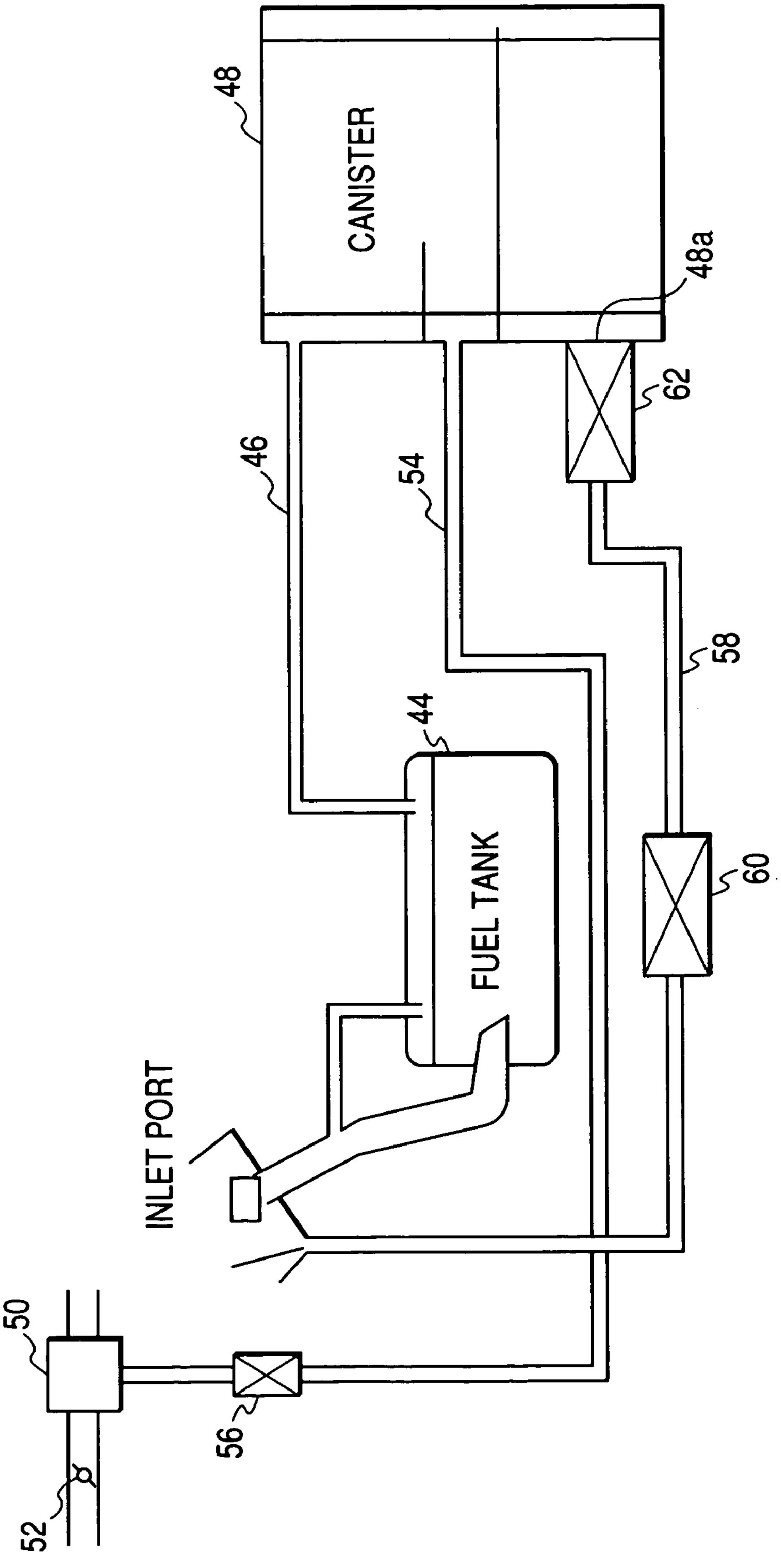
FIG. 2 is a block diagram which shows an automotive evaporative purge system in which a fuel vapor leakage check is made by the ECU, as illustrated in FIG. 1.

The evaporative purge system and the fuel vapor leakage check will be described below with reference to FIG. 2.

The evaporative purge system includes a canister 48 and a solenoid-operated purge valve 56. The canister 48 connects with a fuel tank 44 through an evaporative emission path 46 and also with an inlet pipe 50 of the engine through the purge valve 56 installed in a purge path 54. The purge valve 56 works to establish communication between the purge path 54 and a portion of the inlet pipe 50 located downstream of a throttle valve 54 to purge the canister 48 of evaporative gas (i.e., fuel vapor).

The evaporative purge system also includes a fresh air inlet path 58, an air filter 60, and an electrically-operated pump module 62. The air filter 60 is installed in the fresh air inlet path 58. The fresh air inlet path 58 communicates with the atmosphere to draw fresh air into an air inlet 48*a* of the canister 48. The pump module 62 is installed in a joint of the fresh air inlet path 58 to the air inlet 48*a* of the canister 48 and works to add the pressure to inside the canister 48. The pump module 62 is made up of an electrically-operated pump, a solenoid valve working to open or close the air inlet 48*a*, and a pressure sensor working to measure the pressure within the canister 48.

Usually, the host microcomputer 3 closes the purge valve 56 and opens the solenoid valve of the pump module 62 to communicate the air inlet 48*a* of the canister 48 with the atmosphere. The canister 48 then absorbs fuel vapors evaporated in the fuel tank 44. When a given operating condition of the engine is encountered, that is, when it is required to purge the canister 48, the host microcomputer 3 opens the purge valve 56 to purge the canister 48 of the fuel vapors and vents it to the inlet pipe 50 together with the air entering the air inlet 48*a* of the canister 48 through the fresh air inlet path 58 wit aid of a vacuum in the inlet pipe 50. The fuel vapors drawn into the inlet pipe 50 are burned in the engine.

The fuel vapor leakage check is made in the following steps.

First, the host microcomputer 3 closes the purge valve 56 and opens the solenoid valve of the pump module 62. The host microcomputer 3 also activates the electrically-operated pump of the pump module 62 to decrease the pressure in the canister 48, the evaporative emission path 46, and the fuel tank 44 down to a negative level. Subsequently, the host microcomputer 3 closes the solenoid valve of the pump module 62 and monitors the pressure in the canister 48 at regular intervals using an output of the pressure sensor installed in the pump module 62 to find a variation in the pressure in the canister 48. The host microcomputer 3 uses such a pressure variation to determine whether the evaporative purge system is malfunctioning or not due to, for example, holes or cracks occurring in the canister 48, the evaporative emission path 46, or the fuel tank 44.

The operations of the host microcomputer 3 will be also be described below in detail with reference to FIGS. 3 and 4.

Figure 3:
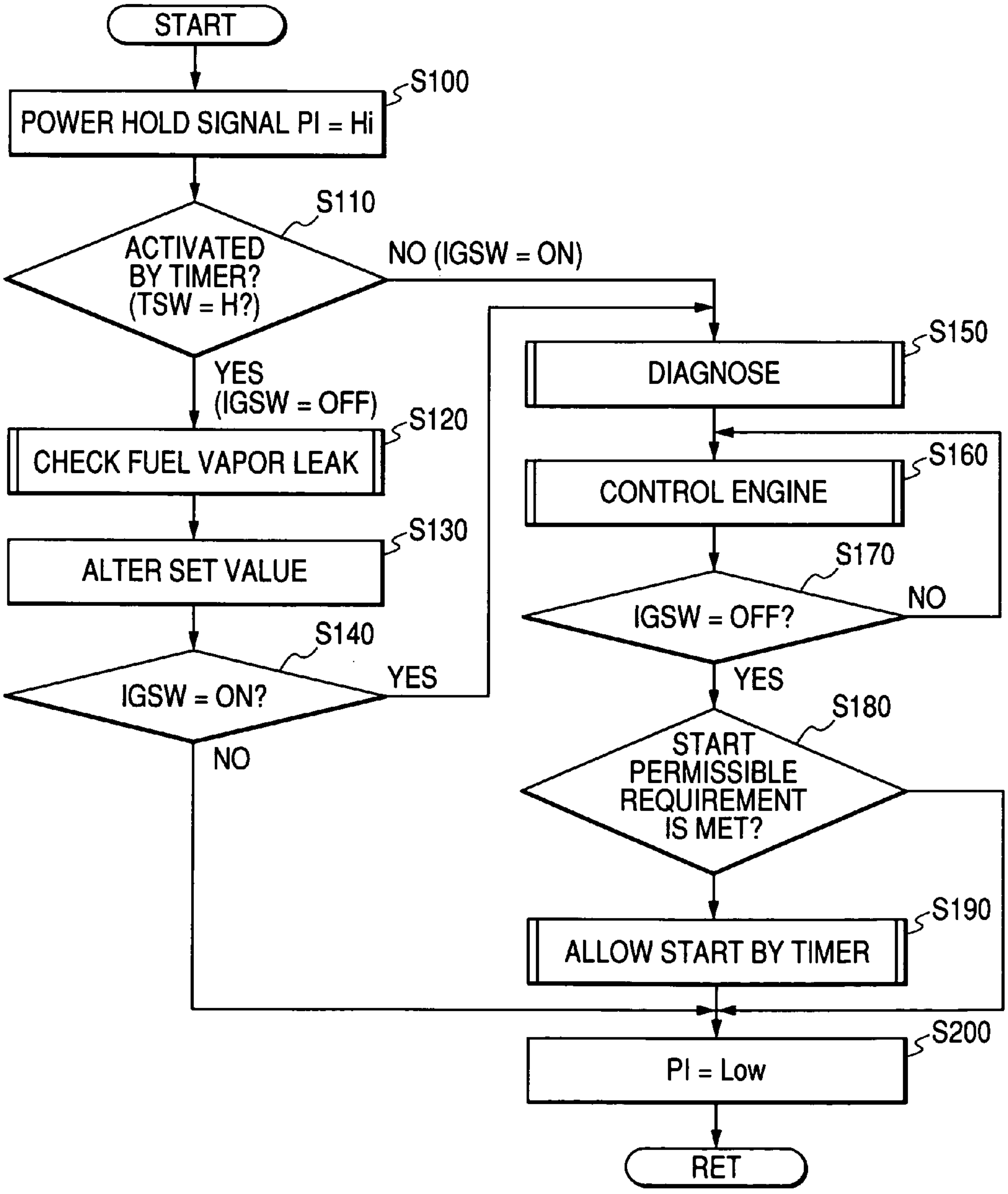
FIG. 3 is a flowchart of a main program in which engine control tasks, a fuel vapor leakage check, a diagnosis task, a timer activation task, etc. are to be executed by a microcomputer of the ECU of FIG. 1.
Figure 4:
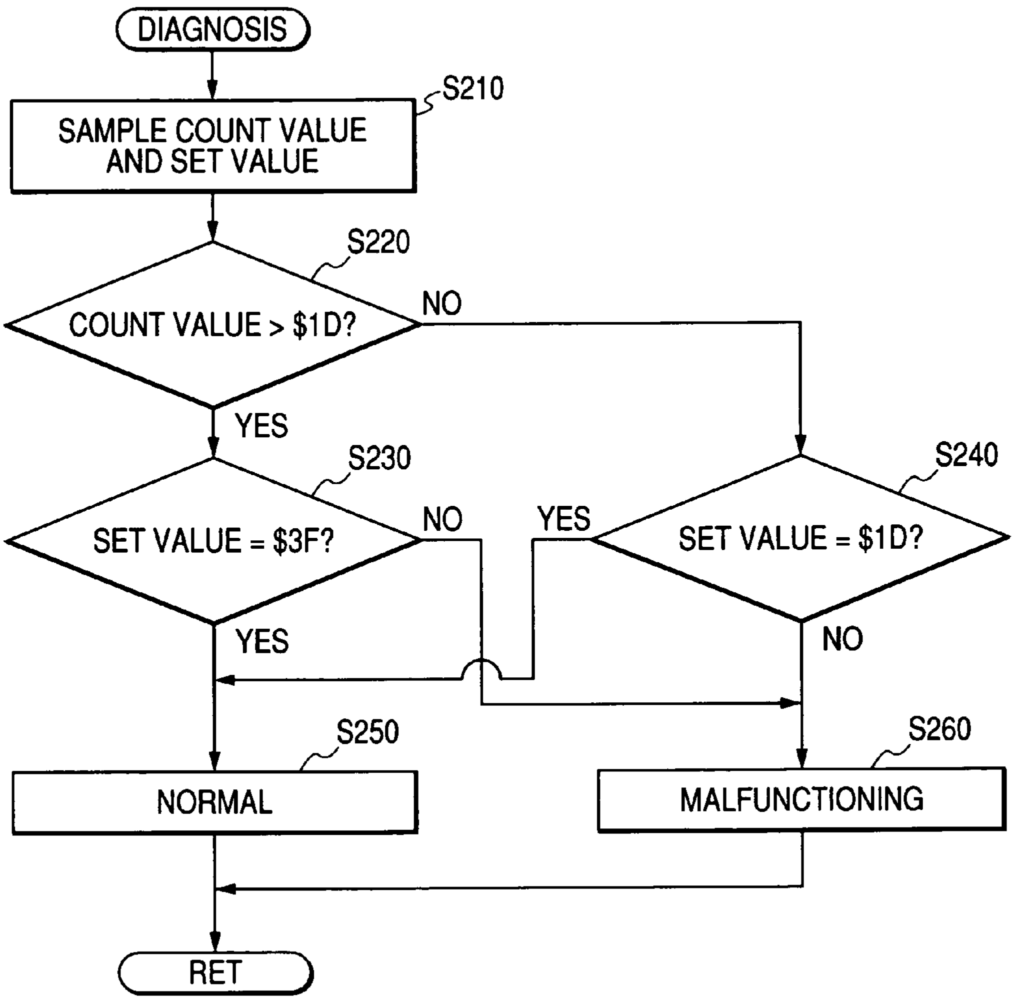
FIG. 4 is a flowchart of a timer malfunction diagnostic program to be executed in the main program of FIG. 3.

FIG. 3 is a flowchart of a main program to be executed by the host microcomputer 3. FIG. 4 is a flowchart of a timer diagnosing program to be executed by the host microcomputer 3 when activated upon turning on of the ignition switch 13.

Upon supply of the operating voltage Vom from the power supply circuit 11, the host microcomputer 3 is turned on to start the program of FIG. 3. First, in step 100, the power hold signal PI to be inputted to the OR circuit 42 is switched to the high level to keep the operating voltage Vom supplied to the host microcomputer 3.

The routine proceeds to step 110 wherein it is determined whether the host microcomputer 3 has been started by the operation of the timer circuit 5 or not. Specifically, the host microcomputer 3 reads a count value from the counter 36 of the timer circuit 5 and check whether the count value has reached the set value stored in the register 38, so that the power supply signal TSW has been switched to the high level or not. In other words, step 110 determines whether the activation of the host microcomputer 3 has been achieved by the turning on of the ignition switch 13 or output of the power supply signal TSW from the comparator 40. This determination may alternatively be made by directly sampling the on/off state of the ignition switch 13 or the level of the power supply signal TSW inputted from the comparator 40 to the OR circuit 42.

If a YES answer is obtained in step 10 meaning that the host microcomputer 3 has been activated by the timer circuit 5, then the routine proceeds to step 120 to check the fuel vapor leakage from the evaporative purge system in the manner, as described above. Results of this leakage check are written in the memory 32 or 20 of the host microcomputer 3. If, however, such writing is infeasible because of a lack of the operating voltage, the results of the leakage check may be saved using a counter (not shown) installed in the host microcomputer 3.

After completion of the fuel vapor leakage check in step 120, the routine proceeds to step 130 wherein the set value stored in the register 38 of the timer circuit 5 is changed. This will be described below with reference to FIG. 5(*a*).

The counter 36 of the timer circuit 5 is resigned to count up from an initial value and stops the counting when the court value reaches an upper limit of a counting range. The counter 36 may alternatively be designed to count down from the initial value.

Figure 5A:
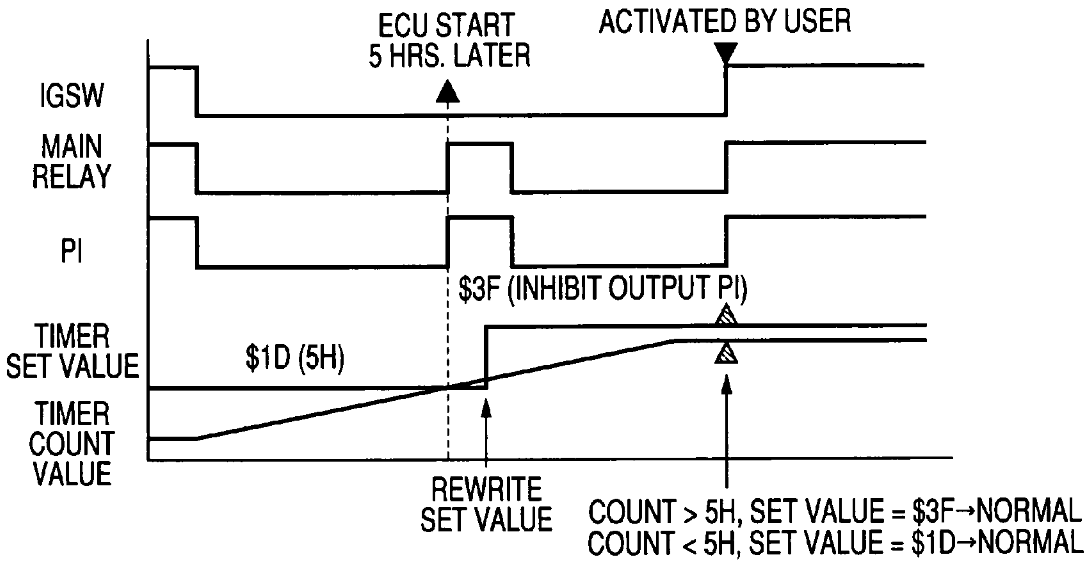
FIG. 5(*a*) is a time chart which represents ignition- and timer-activated operations of the ECU of FIG. 1.
Figure 5B:
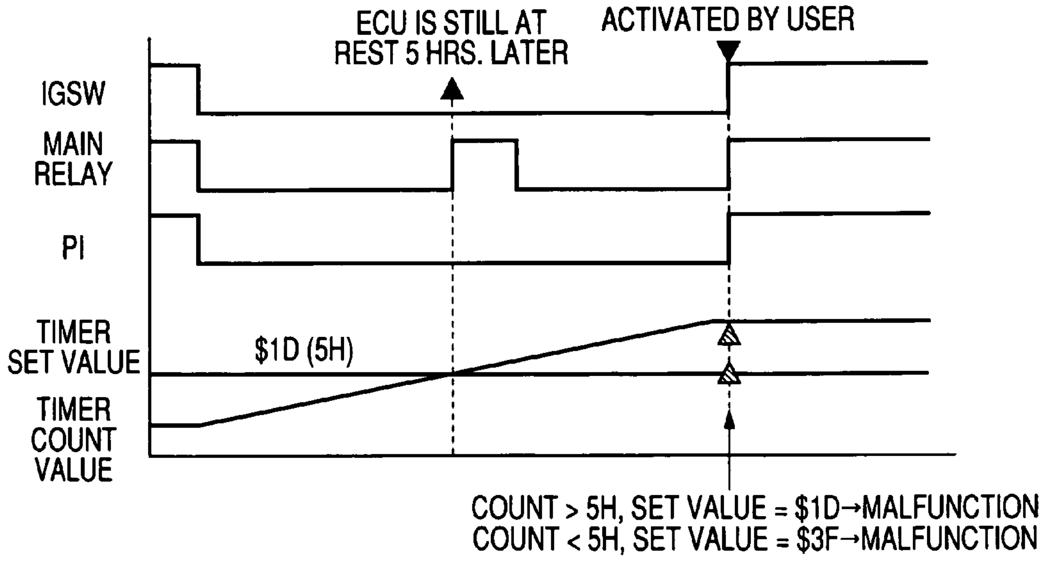

The set value saved initially in the register 38 is so selected as to match a count value shown by the counter 36 when the counter 36 has counted approximately five (5) hours ($1D in FIG. 5(*a*)). The set value is changed in step 130 to a value ($3F) greater than the upper limit of the counting range of the counter 36. This prohibits the host microcomputer 3 from being activated again by the timer circuit 5 after once being turned on by the timer circuit 5. This causes the set value changed to be retained in the register 38 as it is and minimizes the electric power consumed by the host microcomputer 3.

After step 130, the routine proceeds to step 140 wherein it is determined whether the ignition switch has been turned on or not by monitoring the ignition on/off signal IGSW. This determination may alternatively be made using the engine starter signal STA indicative of an on- or off-state of the engine starter. When the ignition switch 13 is turned on during the on-state of the host microcomputer 3 established by the timer circuit 5, the routine proceeds to step 150 for performing controls of the engine such as ignition timing and fuel injection controls in the host microcomputer 3. Alternatively, if it is determined in step 140 that the ignition switch 13 is still placed in the off-state, then the routine proceeds to step 200.

In step 200, the power hold signal PI is switched to the low level and outputted to the OR circuit 42. The OR circuit 42 then stops supplying the energizing power to the main relay 9 to cut the supply of the operating voltage Vom from the power supply circuit 11.

The operation of the host microcomputer 3 when activated by the turning on of the ignition switch 13 will be discussed below.

If a NO answer is obtained in step 110 or a YES answer is obtained in step 140, the routine proceeds to step 150 wherein the diagnosing operation is executed to determine whether the timer circuit 5 is malfunctioning or not. This will be described below with reference to FIG. 4.

First, in step 210, the host microcomputer 3 reads the count value and the set value out of the counter 36 and the register 38, respectively. The routine proceeds to step 220 wherein it is determined whether the count value is greater than a value $1D identical with the set value initially stored in the register 38. If a YES answer is obtained, then the routine proceeds to step 230. Alternatively, if a NO answer is obtained, then the routine proceeds to step 240.

In step 230, it is determined whether the set value read out of the register 38 has been altered from an initial one (i.e., $1D) or not, that is, whether the set value is identical with an altered value $3F or not. When the count value of the counter 36 exceeds the initial set value $1D read out of the register 38, and the timer circuit 5 is operating normally, it will cause, as can be seen in FIG. 5(*a*), the host microcomputer 3 to be activated to alter the set value $1D to the value $3F in the register 38. Thus, if a YES answer is obtained in step 230, then the routine proceeds to step 250 wherein it is determined that the inner circuit 5 is operating normally.

Alternatively, when the initial set value $1D is not altered to the value $3F after the count value of the counter 36 has exceeded the value $1D, it may be decided, as demonstrated in FIG. 5(*b*), that some problem, for example, a malfunction of the power supply circuit 7 or an excessive drop in service voltage of the battery 15, has arisen in the counter circuit 5, thus resulting in a difficulty in activating the host microcomputer 5. Therefore, if a NO answer is obtained in step 230, then the routine proceeds to step 260 wherein the timer circuit 5 is determined to be malfunctioning, and a diagnostic trouble code is stored in the host microcomputer 3 and/or a warning lamp is turned on.

If a NO answer is obtained in step 220 meaning that the count value of the counter 36 is smaller than the initial set value $1D to be stored in the register 38 then the routine proceeds to step 240 wherein it is determined whether a value now stored in the register 38 is identical with the initial set value $1D or not. When the count value of the counter 36 is smaller than the initial set value $1D, and the timer circuit 5 is operating normally, it will cause the initial set value $1D to be stored as it is in the register 38 and the host microcomputer 3 to be still placed in the off-state. Thus, if a YES answer is obtained in step 240, then the routine proceeds to step 250 wherein it is determined that the timer circuit 5 is operating normally.

Alternatively, when the count value of the counter 36 is smaller than the initial set value $1D, but a value now stored in the register has been changed to the value $3F, it means that some problem has arisen in the timer circuit 5, thus resulting in activation of the host microcomputer 3. In this case, a NO answer is obtained in step 240. The routine, thus, proceeds to step 260 wherein the timer circuit 5 is determined to be malfunctioning, and the diagnostic trouble code is stored in the host microcomputer 3 and/or the warning lamp is turned on.

After the operating status of the timer circuit 5 is determined in step 250 or 260, the routine returns back to the flowchart of FIG. 3 and proceeds to step 160 wherein engine controls such as controls of the ignition timing, the injection quantity of fuel, and the throttle valve position and the evaporative purge control, as described above, are performed based on the sensor outputs and the gear position signal.

The routine proceeds to step 170 wherein it is determined whether the ignition switch 13 is turned off or not. If a NO answer is obtained meaning that the ignitions witch 13 is still in the on-state, the routine returns back to step 160 to continue the engine controls and the evaporative purge control. Alternatively, if a YES answer is obtained meaning that the ignition switch 13 has been turned off, the routine proceeds to step 180 wherein it is determined whether a given operation start permissible requirement for starting the host microcomputer 3 later through the timer circuit 5 is met or not. Specifically, if it is determined in step 250 of FIG. 4 that the timer circuit 5 is operating normally, the operation start permissible requirement is determined to have been met. Alternatively, if it is determined in step 260 of FIG. 4 that the timer circuit 5 is malfunctioning, the operation start permissible requirement is determined not to have been met.

If the operation start permissible requirement is determined to have been met, then the routine proceeds to step 190 wherein the host microcomputer 3 is allowed to be activated through the timer circuit 5. Specifically, the timer circuit 5 first clears the counter 36 to start the counting from the initial value and write the set value $1D in the register 38. This causes the comparator 40 to output the power supply signal TSW of high level when the count value of the counter 36 reaches the set value $1D.

Alternatively, if the operation start permissible requirement is determined not to have been net, then the routine proceeds directly to step 200 wherein the host microcomputer 3, as described above, switches the power hold signal PI to the low level to turn off itself.

As apparent from the above discussion, when a given period of time expires since the ignition switch 13 has been turned off, that is, when the count value of the counter 36 reaches the set value as stored in the register 38, the engine ECU 1 starts the fuel vapor leakage check. If, therefore, the timer circuit 5 is malfunctioning, it will result in an error in performing the fuel vapor leakage check. In order to avoid this problem, it is necessary to monitor the operating condition of the timer circuit 5 to detect the malfunctioning thereof. Such detection may be achieved by leaving a timer-activated history record in the memory 32 (SRAM) which indicates the fact that the host microcomputer 3 has been activated upon expiry of the time measured by the counter 36, reading a value out of the memory 32 when the host microcomputer 3 is activated again upon turning on of the ignition switch 13, and analyzing the presence or absence of the history record and the value read out of the register 38 to diagnose the operating condition of the timer circuit 5. However, if the operating voltage Vom, as produced by the power supply circuit 11, has dropped undesirably when the time counted by the counter 36 expires, and it is required to activate the host microcomputer 3 through the power supply circuit 11, it may result in a difficulty for the host microcomputer 3 to write the history record in the memory 32 correctly, which causes the host microcomputer 3 to determine in error that the timer circuit 5 is malfunctioning upon turning on of the ignition switch 13. To eliminate this drawback, the host microcomputer 3 is, as described above, designed to alter the set value stored in the register 38 in which data can usually be written on a minimum operating voltage required to activate the host microcomputer 3 as a timer-activated history record indicating the fact that the host microcomputer 3 has been activated upon expiry of the time counted by the counter 36, read a value out of the register 38 when the host microcomputer 3 is activated again upon turning on of the ignition switch 13, and analyze the history record and the value read out of the register 38 to diagnose the operating condition of the timer circuit 5.

The host microcomputer 3 may be modified as follows: The fuel vapor leakage check is, as described above, made only once after the ignition switch 13 is turned off, but may be carried out several times. This is achieved by altering the set value in the register 38 stepwise within the counting range of the counter 36. This also allows the number of times the host microcomputer 3 has been activated by the timer circuit 5 to be found by counting the number of times the set value has been altered in the register value 38.

The host microcomputer 3, as described above, alters the set value in the register 38 to outside the counting range of the counter 38 in order to prohibit the host microcomputer 3 from being restarted by the timer circuit 5 after once having been activated. This may alternatively be made by installing a logic circuit including an AND gate between the comparator 40 and the OR circuit 42 so that a low level signal may be inputted to one of input terminals of the AND gate when the set value in the register 38 has been changed. Specifically, if having been outputted from the comparator 40, the power supply signal TSW is not inputted to the OR circuit 42, thus prohibiting the host microcomputer 3 from being restarted by the timer circuit 5. A logic circuit may alternatively be installed which works to inhibit the comparator 40 from making a comparison between inputs once the set value in the register 38 has been changed. In this case, the host microcomputer 3 alters the set value in the register 38 to outside the counting range of the counter 36.

Figure 6:
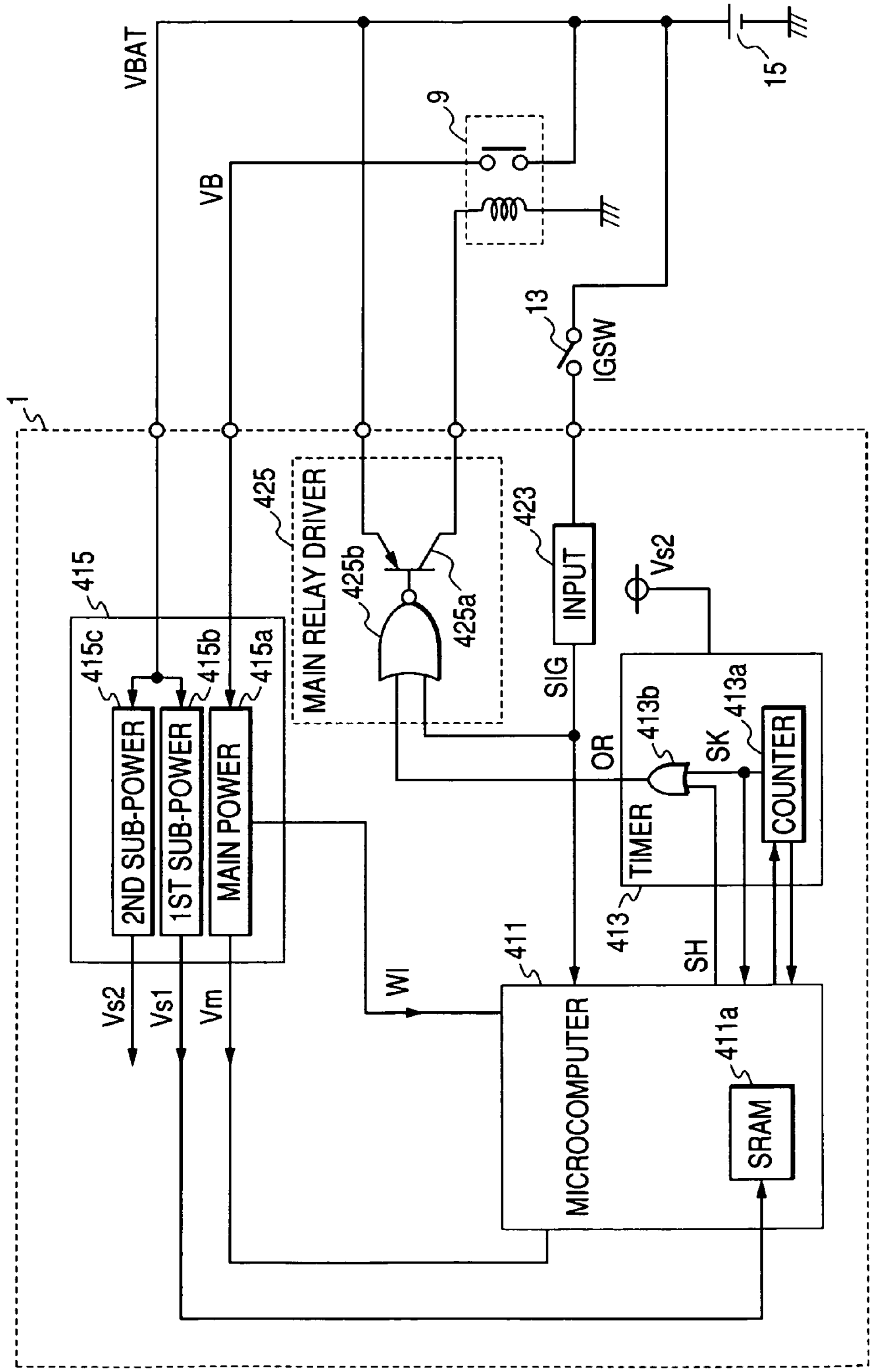
FIG. 6 is a block diagram which shows an engine electronic control unit (ECU) equipped with a timer-activated function according to the second embodiment of the invention.

FIG. 6 shows the engine ECU 1 according to the second embodiment of the invention.

The ECU 1 consists essentially of a microcomputer 411, a timer IC 413, a power supply circuit 415, an input circuit 423, and a main relay control circuit 425. The microcomputer 411, like the first embodiment, works to perform some tasks for controlling the engine of the vehicle. The timer IC 413 works to count the time for which the microcomputer 411 is at rest. The power supply circuit 415 is made up of a main power supply **415*a*, a first sub-power supply 415*b*, and a second sub-power supply 415*c*. The main power supply 415*a* works to provide electrical power or operating voltage Vm to turn on the microcomputer 411. The first sub-power supply 415*b* works to supply sub-voltage Vs1 to a SRAM 411*a* installed within the microcomputer 411 for retaining data therein at all times. The second sub-power supply 415*c* works to provide sub-voltage Vs2 to activate the timer IC 413. The operating voltage Vrm and the sub-voltage Vs2 are 5V. The sub-voltage Vs1 is 3V. "○" in FIG. 6 and FIG. 12 referred to later indicates each terminal of the ECU 1**.

The first and second sub-power supplies **415*b* and 415*c* are supplied with an output voltage of, for example, 12V developed by the storage battery 15 mounted in the vehicle and convert it into the sub-voltages Vs1 and Vs2** at all the time, respectively.

The main power supply **415*a* is supplied with the output voltage of the battery 15 through the main relay 9 when the ignition switch 13 is turned on or an output request signal OR outputted from the timer IC 413 is in a high level. The output request signal OR is placed in the high level when at least one of a power supply signal SK outputted from a counter 413*a*, as will be described later in detail, and a power hold signal SH outputted from the microcomputer 411 is in a high level. In the following discussion, an output voltage of the battery 15 which is provided to the power supply circuit 415 through the main relay 9 will be referred to as battery voltage VB, and which is provided directly to the power supply circuit 415** will be referred to as battery voltage VBAT below.

The main power supply **15*a* works to convert the battery voltage VB into the operating voltage Vm and output it to the microcomputer 411**.

The ECU 1 includes, as described above, the input circuit 423. Upon input of the battery voltage BVAT through the ignition switch 13, the input circuit 423 produces an ignition on/off signal SIG of 5V (i.e., logic high level). When the ignition switch 13 is turned off, so that no battery voltage VBAT is inputted, the input circuit 423 produces an ignition on/off signal SIG of 0V (i.e., logic low level). The ignition on/off signal SIG is a signal indicating an on- or off-state of the ignition switch 13.

The main relay control circuit 425 is made up of a PNP transistor **425*a* and a NOR circuit 425*b*. The main relay 9, like the one in the first embodiment, includes a coil and a switch. The PNP transistor 425*a* connects at collector with an end of the coil of the main relay 9 and at emitter with the battery voltage VBAT. When turned on, the PNP transistor 425*a* supplies an electrical current to the coil of the main relay 9. The NOR circuit 425*b* works to turn on the PNP transistor 425*a* when at least one of the ignition on/off signal SIG inputted from the input circuit 423 and the output request signal OR inputted from the timer IC 413** is in the high level.

Specifically, when the NOR circuit **425*b* turns on the PNP transistor 425*a*, the main relay control circuit 425 energizes the coil of the main relay 9 to close the switch, thereby establishing electrical connection between the battery 15 and the power supply circuit 415. Although not illustrated, the main relay control circuit 425 (i.e., the NOR circuit 425*b*) is designed to operate, like the timer IC 413, on the sub-voltage Vs2 outputted from the second sub-power supply 415*c***.

When either one of the ignition on/off signal SIG and the output request signal OR is in the high level, the main relay 9 is turned on or closed to establish the electrical connection of the main power supply **415*a* to the battery voltage VB, so that the main power supply 415*a*** outputs the operating voltage Vm. Note that the logical high and low levels of the signals SIG SH, SK, ard OR represent an active and a passive level, respectively.

The main power supply **415*a* is also designed to provide a write inhibit signal WI to the microcomputer 411. The write inhibit signal WI has a logic level changing when the operating voltage Vm, as produced by the main power supply 415*a***, drops below a given voltage Va (e.g., 4.5V).

Figure 7:
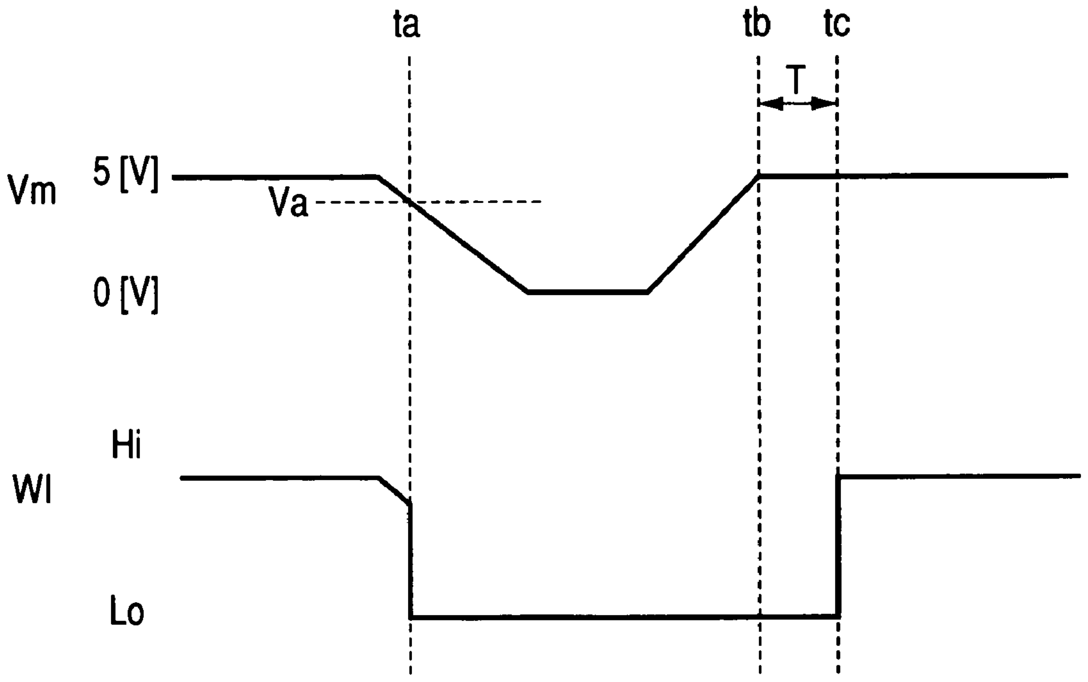
FIG. 7 is a time chart which represents changes in level of an operating voltage and a write inhibit signal, as used in the ECU of FIG. 6.

Specifically, the write inhibit signal WI is a signal functioning to inhibit the microcomputer 411 from writing data in the SRAM **411*a* and changes from a high to low level, as shown in FIG. 7, when the operating voltage Vm (5V) outputted from the main power supply 415*a* decreases to the given voltage Va at time ta. Afterwards, when the main power supply 415*a*** returns to a condition at time tb where the operating voltage Vm of 5V is outputable, the write inhibit signal WI is returned to the high level at time tc after a lapse of time T. Note that the logical low level of the write inhibit signal WT is an active level.

The main power supply **415*a* is equipped with a power-on reset function which, upon request to output the operating voltage Vm, outputs a rest signal to the microcomputer 411 for a given short time required to stabilize the operating voltage Vm. Thus, when the main power supply 415*a* starts to output the operating voltage Vm, the microcomputer 411** starts from an initial state.

The timer IC 413 is made up of the counter **413*a* and the OR circuit 413*b*. The counter 413*a*** is designed to count up.

When either one of the power hold signal SH outputted from the microcomputer 411 and the power supply signal SK outputted from the counter 413*a* is in the high level, the OR circuit 413*b* produces the output request signal OR in the high level.

The timer IC 413 include five functions below.

(1) Upon request from the microcomputer 411 to clear a count value of the counter 413*a*, the timer IC 413 resets the count value to an initial value of zero (0).

(2) The timer IC 413 retains a set value Ns outputted from the microcomputer 411 for comparison with the count value. The value Ns is set by the microcomputer 411 to be smaller than a maximum value within a counting range of the counter 413*a*. For example, the set value Ns is selected as a value immediately before the maximum value.

(3) When the count value of the counter 413*a* reaches the set value Ns, the timer IC 413 keeps the power supply signal SK to be outputted to the OR circuit 413*b* at the high level. Upon input of the power supply signal SK, the OR circuit 413*b* keeps the output request signal OR to be outputted the OR circuit 425*b* of the main relay control circuit 425 at the high level.

(4) Upon request to clear the tower supply signal SK from the microcomputer 411, the timer IC 413 resets the power supply signal SK to the low level.

(5) The timer IC 413 permits the microcomputer 411 to read the count value out of the counter 413*a* and also to set the count value to a selected one.

The microcomputer 411 starts to operate on the operating voltage Vm, as produced by the main power supply 415*a*, and provides the power hold signal SH in the high level to the timer IC 413 to keep the main power supply 415*a* outputting the operating voltage Vm, thereby maintaining itself to be in the on-state. Specifically, when the power hold signal SH is switched to the high level, it will cause the output request signal OR to be switched to the high level, so that the ECU 1 continues to be supplied with the battery voltage VB through the main relay 9, thus keeping the operating voltage Vm outputting the microcomputer 411.

When the write inhibit signal WI inputted to the microcomputer 411 from the main power supply 415*a* is in the low level, it prohibits, as described above, the microcomputer 411 from writing data in the SRAM 411*a*. When the microcomputer 411 has been started following turning on of the ignition switch 13, in other words, when the ignition on/off signal SIG has been switched to the high level, the microcomputer 411 determines that an operation stop requirement has been met upon completion of all engine stop tasks to be executed after the ignition switch 13 is turned off and switches the power hold signal SH to the low level to cut the supply of the operating voltage Vm from the main power supply 415*a*, thereby turning off itself.

Alternatively, when the timer IC 413 has switched the output request signal OR to the high level during the off-state of the ignition switch 13, in other words, when the power supply signal SH has been switched to the high level during the off-state of the ignition switch 13, thereby activating the microcomputer 411, the microcomputer 411 stores a timer-activated history record in the SRAM 411*a* which indicates the microcomputer 411 has been ran by the operation of the timer IC 413.

Afterwards, upon completion of a given task (i.e., a fuel vapor purge system diagnosing operation in this embodiment), the microcomputer 411 determines that the operation stop requirement has been met and outputs the SK clear request to the timer IC 413 to reset the power supply signal SK to the low level. Further, the microcomputer 411 switches the power hold signal SH to the low level to stop the supply of the operating voltage Vm from the main power supply 415*a*, thereby turning off itself.

Figure 8:
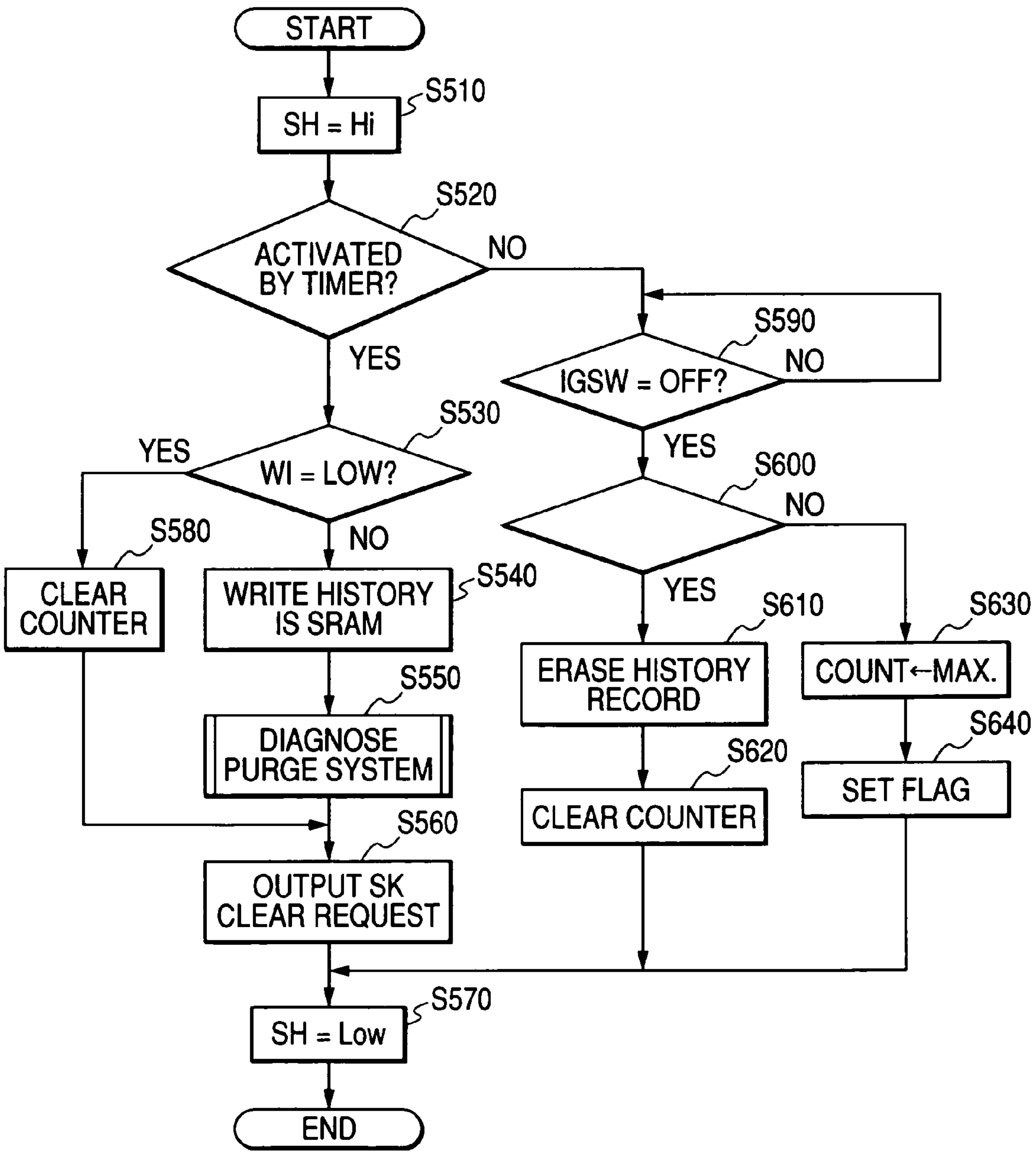
FIG. 8 is a flowchart of a main program in which engine control tasks, a fuel vapor leakage check, a diagnosis task, a timer activation task, etc. are to be executed by a microcomputer of the ECU of FIG. 6.

FIG. 8 is a flowchart of a main program to be executed by the microcomputer 411 upon supply of the operating voltage Vm from the main power supply 15*a*.

After entering the program, the routine proceeds to step 510 wherein the power hold signal SH to be inputted to the OR circuit 413*b* of the timer IC 413 is switched to the high level to have the OR circuit 413*b* output the output request signal OR in the high level, thereby turning on the main relay 9. This keeps the main power supply 415*a* outputting the operating voltage Vm.

The routine proceeds to step 520 wherein it is determined whether the microcomputer 411 has been activated by the operation of the timer IC 413 or by turning on of the ignition switch 13. Specifically, the microcomputer 411 samples the logical level of the power supply signal SK produced by the timer IC 413 and determines whether it is the high level or not. If the power supply signal SK is in the high level meaning that the microcomputer 411 has been started by the timer IC 413, then the routine proceeds to step 530.

In step 530, the microcomputer 411 samples the logical level of the write inhibit signal WI produced by the main power supply 415*a* and determines whether it is the low level or not. If the write inhibit signal WI is not in the low level, the routine proceeds to step 540 wherein the timer-activated history record, as described above, is stored in the SRAM 411*a*.

The routine proceeds to step 550 wherein the fuel vapor leakage check, as already described in the first embodiment is made to diagnose the evaporative purge system. Results of this leakage check are written, for example, in the SRAM 411*a* of the microcomputer 411 and read out by a diagnosis device (not shown) connected to the ECU 1 upon request. If it is determined that the fuel vapor is leaking from the evaporative purge system, it may be indicated on a display installed in the vehicle.

After the evaporative purge system is diagnosed in step 550, the routine proceeds to step 560 wherein the SK clear request is outputted to the timer IC 413 to switch the power supply signal SK to the low level.

The routine proceeds to step 570 wherein the power hold signal SH is returned to the low level and outputted to the timer IC 513. This causes the output request signal OR to be changed to the low level to turn off the main relay 9, thereby stopping the supply of the operating voltage Vm from the main power supply 415*a* to turn off the ECU 1 (i.e., the microcomputer 411).

If a YES answer is obtained in step 530 meaning that the write inhibit signal WI is in the low level, then the routine proceeds to step 580 wherein the counter clear request is outputted to the timer IC 413 to clear the count value of the counter 413*a*. Additionally, the microcomputer 411 also outputs the set value Ns to the timer IC 413 and stores it in the timer IC 413.

After step 580, the routine proceeds to step 560 to output, as described above, the SK clear request to the timer IC 413.

If a NO answer is obtained in step 520 meaning that the power supply signal SK is in the low lever which indicates that the microcomputer 411 has started following the turning on of the ignition switch 13, then the routine proceeds to step 590 wherein the logical level of the ignition on/off signal SIG outputted from the input circuit 423 is sampled to determine whether the ignition switch 13 is in the off-state or not. If a NO answer is obtained meaning that the ignition switch 13 has been turned on, the routine repeats step 590 until the ignition switch is turned off. Alternatively, if a YES answer is obtained meaning that the ignition switch 13 is in the off-state, then the routine proceeds to step 600 wherein it is determined whether the ECU 1 run the engine before the ignition switch 13 is turned off or not.

If a YES answer is obtained in step 600, then the routine proceeds to step 610 wherein the timer-activated history record stored in the SRAM 411*a* is erased. The routine proceeds to step 620 wherein the counter clear request is outputted to the timer IC 413 to clear the count value of the counter 413*a*, and the set value Ns is also outputted to the timer IC 413 and reset in the counter 413*a*.

The routine proceeds to step 570 wherein the power hold signal SH is returned to the low level and outputted to the timer IC 413. This causes the output request signal OR to be changed to the low level to turn off the main relay 9, thereby stopping the supply of the operating voltage Vm from the main power supply 415*a* to turn off the ECU 1. Afterwards, when the count value of the counter 413*a* reaches the set value Ns during the off-state of the ignition switch 13, the timer IC 413 activates the microcomputer 411.

Alternatively, if a NO answer is obtained in step 600, that is, the ECU 1 didn't run the engine, it means that it is unnecessary to diagnose the evaporative purge system before the microcomputer 411 is activated by the ignition switch 13. The routine then proceeds to step 630 wherein the count value of the counter 413*a* is altered to a maximum value greater than the set value Ns. This prohibits the timer IC 413 from closing the main relay 9 to run the microcomputer 411 again after completion of current tasks being executed in the microcomputer 411.

The routine proceeds to step 640 wherein a flag FA in the SRAM 411*a* is set to indicate that the microcomputer 411 is inhibited from being activated by the operation of the timer IC 413. The routine proceeds to step 570 to return, as described above, the power hold signal SH to the low level, thereby turning off the ECU 1.

Figure 9:
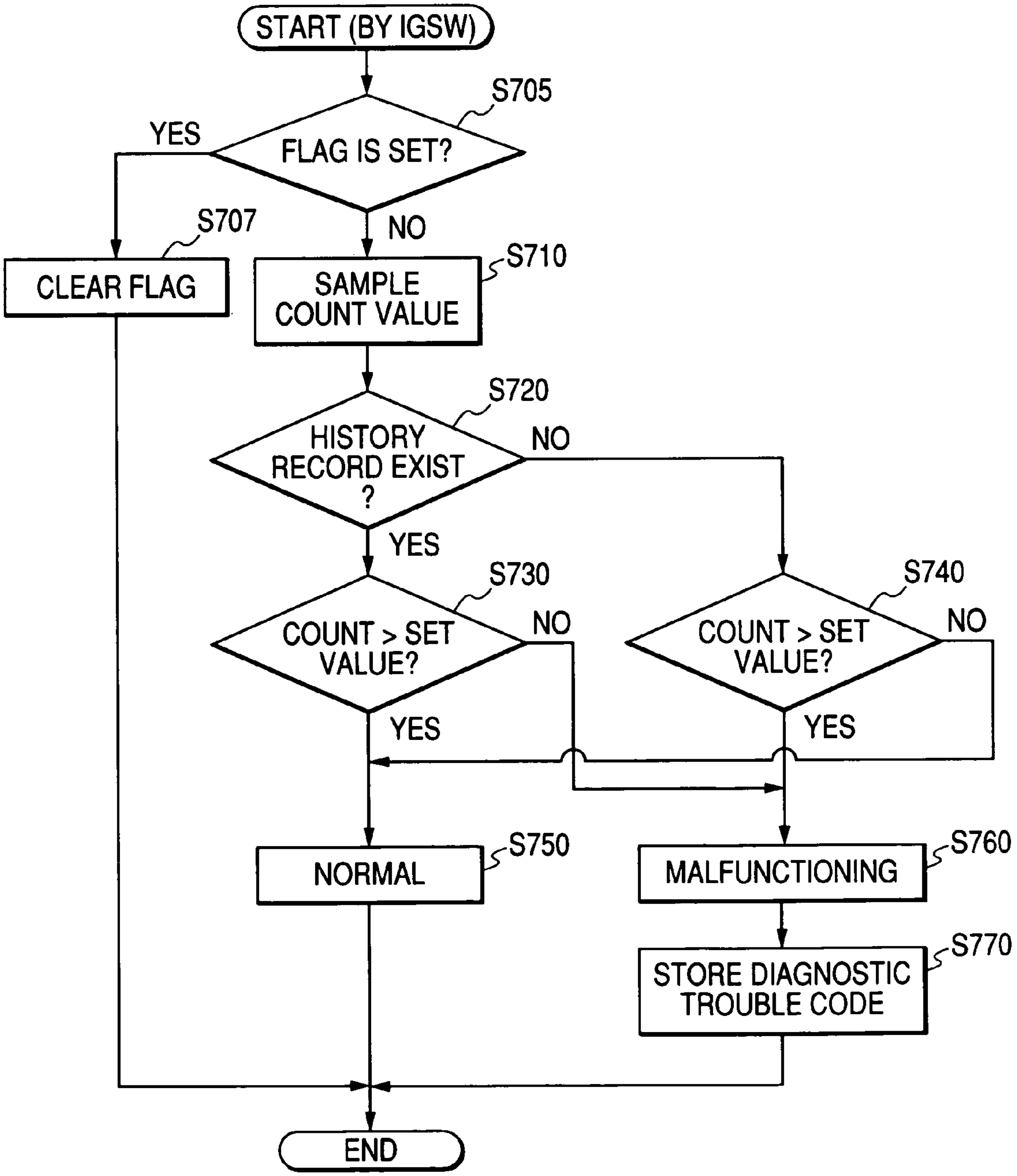
FIG. 9 is a flowchart of a timer malfunction diagnostic program to be executed in parallel to the main program of FIG. 8.

FIG. 9 is a flowchart of a timer diagnosis program to be executed by the microcomputer 411 when it is determined that the current activation of the microcomputer 411 is achieved by turning on the ignition switch 13 (i.e., NO in step 520).

First, in step 705, it is determined whether the flag FA stored in the SRAM 411*a* is set or not, that is, whether the microcomputer 411 is inhibited from being activated by the operation of the timer IC 413 or not. If a YES answer is obtained, then the routine proceeds to step 707 to reset the flag FA and terminates. This is because there is no needs for diagnosing the operation of the timer IC 413.

Alternatively, if a NO answer is obtained, then the routine proceeds to step 710 wherein the count value is read out of the counter 413*a* and retained in the SRAM 411*a*. This value will be referred to as a count value CNT below.

The routine proceeds to step 720 wherein it is determined whether the timer-activated history record is stored in the SRAM 411*a* or not. If a YES answer is obtained, then the routine proceeds to step 730. Alternatively, if a NO answer is obtained, then the routine proceeds to step 740.

In each of steps 730 and 740, it is determined whether the count value CNT, as stored in the SRAM 411*a* in step 710, is greater than the set value Ns or not. If it is determined that the timer-activated history record is stored in the SRAM 411*a* and that the count value CNT is greater than the set value Ns (YES in steps 720 and 730) or it is determined that the timer-activated history record is not stored in the SRAM 411*a* and that the count value CNT is not greater than the set value Ns (NO in steps 720 and 740), then the routine proceeds to step 750 wherein it is determined that the timer IC 413 is in a condition to operate normally and terminates.

Alternatively, if it is determined that the timer-activated history record is stored in the SRAM 411*a* and that the count value CNT is not greater than the set value Ns (YES in step 720 and NO in step 730) or it is determined that the timer-activated history record is not stored in the SRAM 411*a* and that the count value CNT is greater than the set value Ns (NO in step 720 and YES in step 740), then the routine proceeds to step 760 wherein the timer IC 413 is malfunctioning. The routine proceeds to step 770 wherein a diagnostic trouble code is stored in the SRAM 411*a*. The diagnostic trouble code carries diagnosis information indicating the occurrence and contents of malfunction.

Figure 10A:
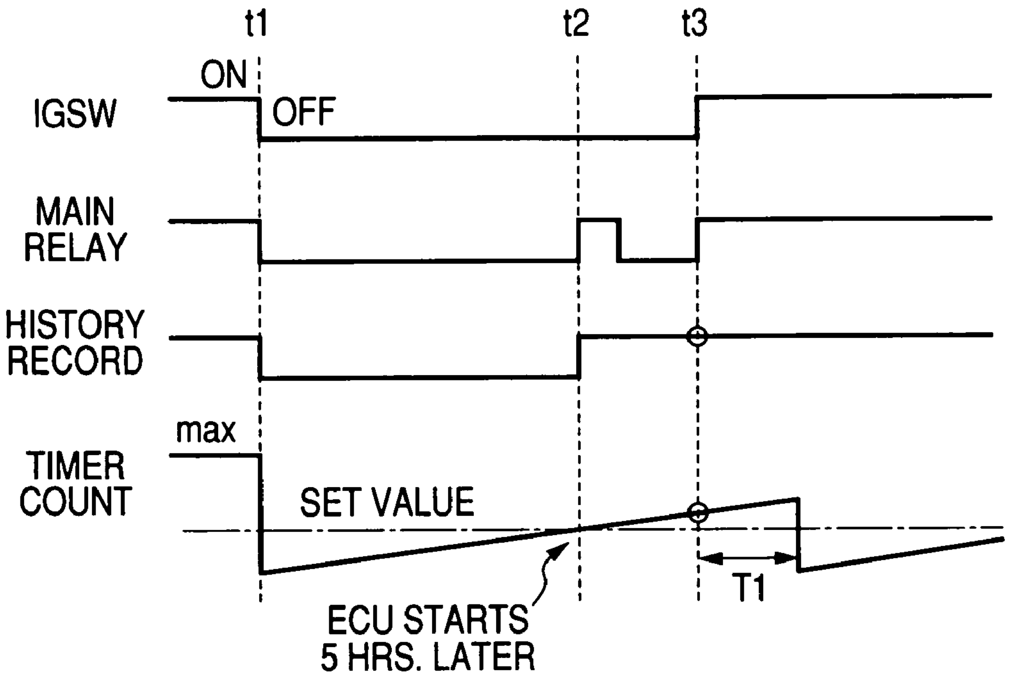
FIG. 10(*a*) is a time chart which represents ignition- and timer-activated operations of the ECU of FIG. 6 when a timer circuit is operating normally, and a write inhibit signal in a logical high level upon activation of the ECU by the timer circuit.
Figure 10B:
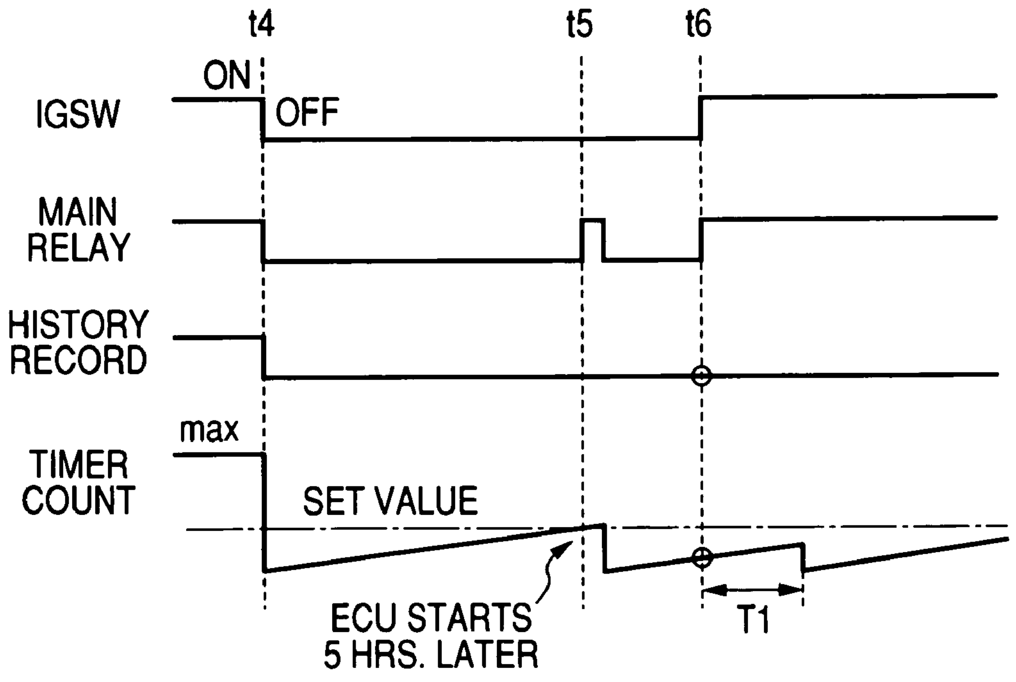
Figure 11:
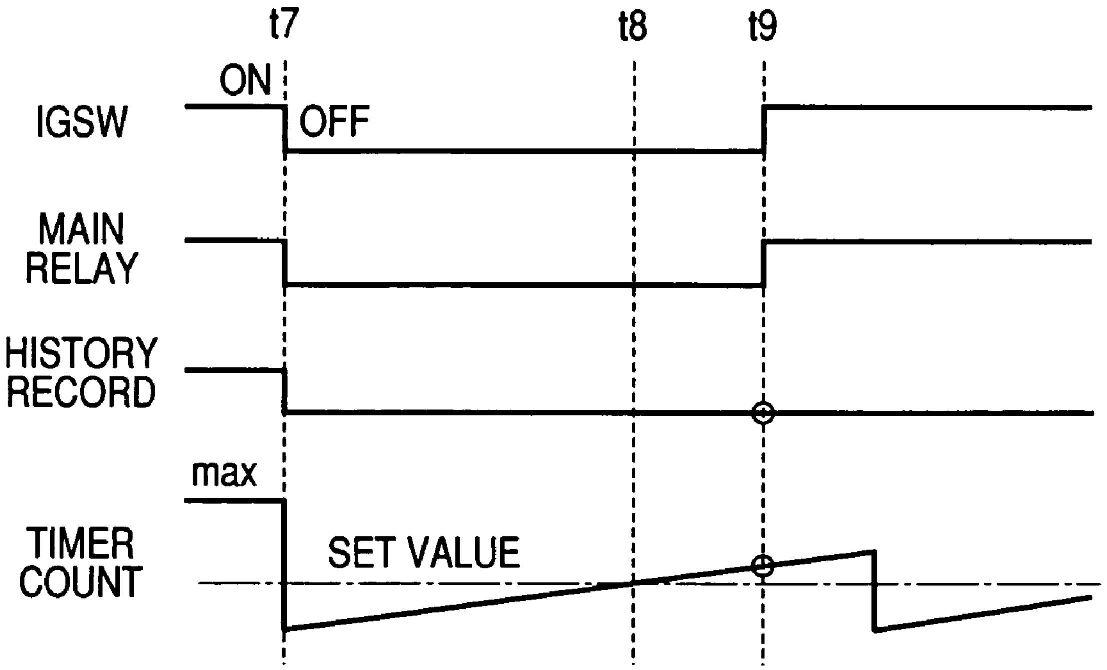
FIG. 11 is a time chart which represents ignition- and timer-activated operations of the ECU of FIG. 6 when a timer circuit is malfunctioning.

The operations of the ECU 1 will be demonstrated below with reference to FIGS. 10(*a*), 10(*b*), and 11. FIGS. 10(*a*) and 10(*b*) both illustrate for the case where the timer IC 413 is in the condition to operate normally. FIG. 10(*a*) demonstrates the operations of the ECU 1 when the microcomputer 411 is activated by the timer IC 413, and the write inhibit signal WI is in the high level. FIG. 10(*b*) demonstrates the operations of the ECU 1 when the microcomputer 411 is activated by the timer IC 413, and the write inhibit signal WI is in the low level. FIG. 11 illustrates for the case where the timer IC 413 is malfunctioning.

In the example of FIG. 10(*a*), before time t1, the ignition switch 13 is in the on-state, so that the ignition on/off signal SIG is in the high level. The main power supply 415*a*, thus, outputs the operating voltage Vm to activate the microcomputer 411. The microcomputer 411 performs the ignition control and fuel injection control for the engine. The power supply signal SK outputted from the timer IC 413 is placed in the low level.

When the ignition switch 13 is turned off at time t1, the microcomputer 411 erases the timer-activated history record in the SRAM 411*a* in step 610 of FIG. 8, resets the count value of the counter 413*a* to zero (0) in step 620, and switches the power hold signal SH to the low level in step 570. The microcomputer 411, as activated following turning on of the ignition switch 13, outputs the counter clear request to the timer IC 413 and then sets the value Ns in the timer IC 413 in step 620 which is equivalent to a set time Ts.

The time Ts is a standby time between a stop of the microcomputer 411 and when the microcomputer 411 restarts and diagnoses the evaporative purge system. The time Ts is selected to be, for example, five (5) hours.

When the power hold signal SH is switched to the low level, it will cause the main power supply 415*a* to stop supplying the operating voltage Vm to deactivate the microcomputer 411. This causes the counter 413*a* of the timer IC 413 to start counting from the initial value.

When the set time Ts expires, so that the count value of the counter 413*a* reaches the set value Ns at time t2, the power supply signal SK outputted from the timer IC 413 is changed to the high level, thereby switching the output request signal OR outputted to the main relay control circuit 425 to the high level. This causes the main relay 9 to be turned on, so that the main power supply 415*a* starts to output the operating voltage Vm.

Upon input of the operating voltage Vm, the microcomputer 411 is activated and switches the power hold signal SH to the high level to secure the supply of the operating voltage Vm to itself. The microcomputer 411 determines in step 520 that the power supply signal SK is in the high level.

In the example of FIG. 10(*a*), the write inhibit signal WI is, as described above, placed in the high level upon activation of the microcomputer 411 by the timer IC 413. The microcomputer 411, thus, determines in step 530 that the write inhibit signal WI is not in the low level.

Subsequently, the microcomputer 411 saves the timer-activated history record in the SRAM 411*a* in step 540 and diagnoses the evaporative purge system to check the fuel vapor leakage. The microcomputer 411 also resets the power supply signal SK outputted from the timer IC 413 to the low level in step 560 and then switches the power hold signal SH to the low level. This causes the output request signal OR outputted from the timer IC 413 to be switched to the low level, so that the main relay 9 is turned off to stop outputting the operating voltage Vm from the main power supply 415*a*, thus deactivating the microcomputer 411 again.

After such deactivation of the microcomputer 411, the timer IC 413 continues counting without resetting the count value of the counter 413*a*. When the ignition switch 13 is turned on at time t3 before the count value reaches the maximum value, the main relay 9 is turned on in response to the ignition on/off signal SIG, so that the operating voltage Vm is outputted from the main power supply 415*a* to restart the microcomputer 411. The microcomputer 411 switches the power hold signal SH to the high level to secure the supply of the operating voltage Vm to itself.

The microcomputer 411 determines in step 520 that it has been activated by the turning on of the ignition switch 13 and performs the diagnosis operation, as shown in FIG. 9, to check the operating condition of the timer IC 413. In this example, the microcomputer 411 determines in step 720 that the timer-activated history record is stored in the SRAM 411*a*, in step 730 that the count value CNT is greater than the set value Ns, and in step 750 that the timer IC 413 is in the condition to operate normally.

Afterwards, the microcomputer 411 repeats the operation in step 590 until the ignition switch 13 is turned off and performs the ignition and fuel injection controls.

Referring to the example of FIG. 10(*b*), the ignition switch 13 is turned off at time t4. Subsequently, when the count value of the timer IC 413 reaches the set value Ns at time t5, the microcomputer 411 is activated.

In this example, the write inhibit signal WI is, as described above, placed in the low level upon the activation of the microcomputer 411. The microcomputer 411, thus, determines in step 530 that the write inhibit signal WI is in the low level, resets the count value of the timer IC 413, and deactivates itself without saving the timer-activated history record in the SRAM 411*a*. Specifically, upon the self deactivation of the microcomputer 411 at time t5, the timer IC 413 resets the count value of the counter 413*a* and starts the counter 413*a* counting from the initial value.

Subsequently, when the ignition switch 13 is turned on at time t6 before the count value reaches the set value Ns, the main relay 9 is turned on in response to the ignition on/off signal SIG, so that the operating voltage Vm is outputted from the main power supply 415*a* to restart the microcomputer 411. The microcomputer 411 determines in step 720 of FIG. 9 that the timer-activated history record is not saved in the SRAM 411*a*, in step 740 that the count value does not exceed the set value Ns, and in step 750 that the timer IC 413 is in the condition to operate normally.

The reason why, after the lapse of the set time T1 from the activation of the microcomputer 411 achieved by the ignition switch 13 at time t3 or t6, the microcomputer 411 resets the count value of the counter 413*a* of the timer IC 413 is that the microcomputer 411 samples the count value of the counter 413*a* a given period of time after the count value is reset and determines whether the timer IC 413 is operating normally or not.

Referring to the example, as demonstrated in FIG. 11, if any problem is encountered, such as a disconnection of a signal line from the timer IC 413 to the main relay control circuit 425 through which the output request signal OR is transmitted or a short circuit of the signal line to a lower level side which will result in a difficulty in activating the main power supply 415*a*, it will cause the output request signal OR in the high level not to be outputted to the main relay control circuit 425 even when the set time Ts expires after the ignition switch 9 is turned off at time t7, and the count value of the counter 413*a* reaches the set value Ns at time t8. The operating voltage Vm is, thus, kept at 0V, so that the microcomputer 411 is still at rest.

When the ignition switch 13 is turned on to start the microcomputer 411 at time t9, the microcomputer 11 determines in step 520 of FIG. 8 that the activation of the microcomputer 411 has been achieved by the ignition switch 9 and performs the diagnosing operation, as illustrated in FIG. 9, in this example, when the microcomputer 411 is performing the operation in step 710, the timer-activated history record is absent in the SRAM 411*a*, but the count value CNT of the timer IC 413 has already exceeded the set value Ns. The microcomputer 411, thus, determines in step 720 that the timer-activated history record is not stored in the SRAM 411*a*, in step 740 that the count value CNT is greater than the set value Ns, and in step 760 that the timer IC 413 is malfunctioning.

As apparent from the above discussion, the ECU 1 of this embodiment is operable to determine that the timer IC 413 is malfunctioning if either one of the following two conditions is met: (1) the timer-activated history record is not written in the SRAM 411*a*, but the count value CNT has exceeded the set value Ns (NO in step 720 and YES in step 740) and (2) the timer-activated history record is written in the SRAM 411*a*, but the count value CNT does not yet exceed the set value Ns (YES in step 720 and NO in step 730).

In other words, the ECU 1 is designed to make either a first decision that the timer IC 413 has some problem when the timer-activated history record is not written in the SRAM 411*a*, but the count value CNT has exceeded the set value Ns or a second decision that the timer IC 413 has some problem when the timer-activated history record is written in the SRAM 411*a*, but the count value CNT does not yet exceed the set value Ns.

In a case that the write inhibit signal WI is in the low level (YES in step 530), so that the microcomputer 411, as activated by the timer IC 413, has not written the timer-activated history record in the SRAM 411*a*, the microcomputer 411 resets the count value of the counter 413*a* (step 580) immediately before being deactivated. Consequently, for example, if the microcomputer 411 is restarted following turning on of the ignition switch 9 before the count value of the counter 413*a* reaches the set value Ns, the first decision made when the timer-activated history record is absent in the SRAM 411*a*, but the count value CNT has exceeded the set value Ns is ensured to be correct.

Further, in a case that the write inhibit signal WI is in the high level (NO in step 530), so that the microcomputer 411, as activated by the timer IC 413, has written the timer-activated history record in the SRAM 411*a*, the microcomputer 411 does not reset the count value of the counter 413*a*. The second decision made when the timer-activated history record is written in the SRAM 411*a*, but the count value CNT does not yet exceed the set value Vs is, thus, ensured to be correct.

The ECU 1 of this embodiment is effective to eliminate an error completely in determining that the timer IC 413 is malfunctioning.

The determination in step 520 of whether the microcomputer 411 has been activated by the operation of the timer IC 413 or not is made by monitoring the power supply signal SK, but however, may alternatively be made using the ignition on/off signal SIG.

Specifically, when the ignition on/off signal SIG is in the low level, it may be determined that the microcomputer 411 has been activated by the timer IC 413.

Figure 13:
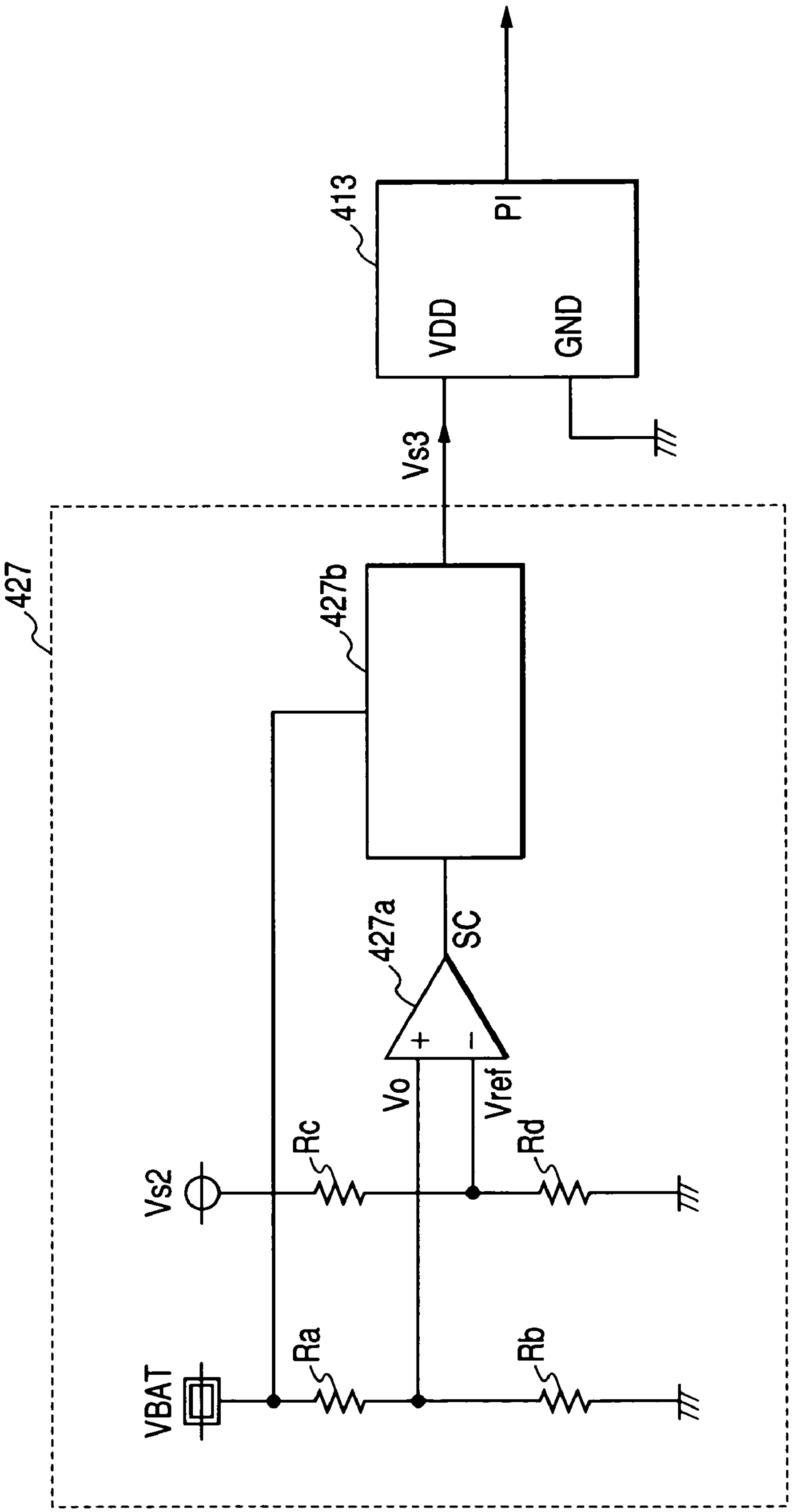
FIG. 13 is a circuit diagram which shows a power supply circuit of the ECU, as illustrated in FIG. 12.

FIG. 13 shows the engine ECU 1 according to the third embodiment of the invention which is different from the one of the second embodiment in four points below.

(1) If it is determined in step 520 of FIG. 8 that the microcomputer 411 has been activated by the timer IC 413, the routine proceeds is directly to step 540 without performing step 530. Specifically, in a case where the write inhibit signal WI is placed in the low level upon activation of the microcomputer 411 by the timer IC 413, the microcomputer 411 does not output the counter clear request to the timer IC 413 when deactivating itself.

(2) If it is determined in step 720 of FIG. 9 that the timer-activated history record is stored in the SRAM 411*a*, the routine proceeds directly to step 750 without performing step 730. Specifically, the microcomputer 411 does not make the second decision, as described above, and decides that the timer IC 413 is in the condition to operate normally when it is determined that the timer-activated history record is present in the SRAM 411*a*.

Figure 12:
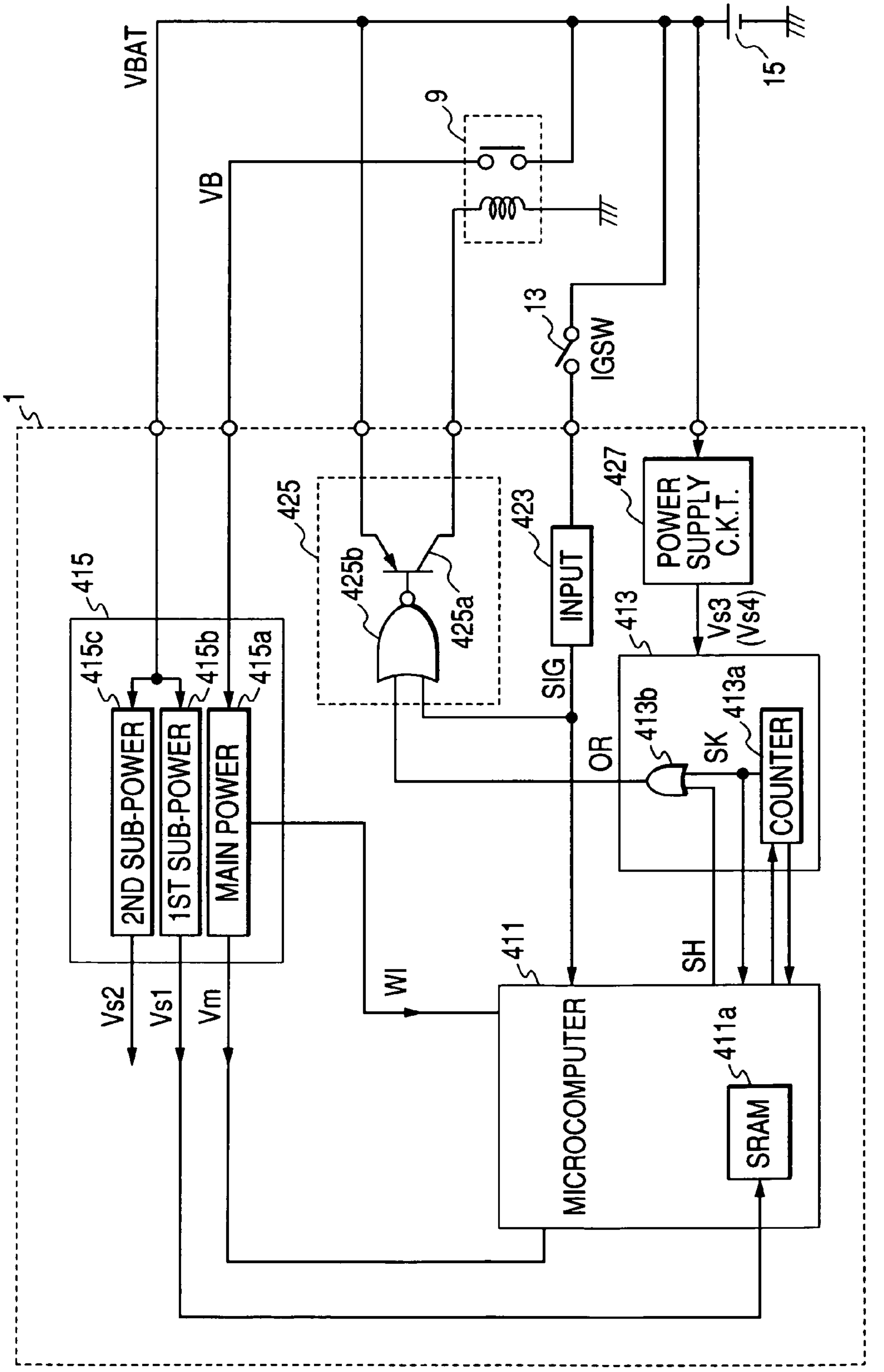
FIG. 12 is a block diagram which shows an engine electronic control unit (ECU) equipped with a timer-activated function according to the third embodiment of the invention.

(3) The ECU 1 is, as clearly shown in FIG. 12, equipped with a power supply circuit 427 which works to supply a voltage Vs3 to the timer IC 413. The ECU 1 of the second embodiment is designed to supply the sub-voltage Vs2 to the time. IC 413 from the second sub-power supply 415*c*, but the ECU 1 of this embodiment is designed to supply the voltage Vs3 to the timer IC 413 from the power supply circuit 427. The power supply circuit 427, as illustrated in FIG. 13, includes a pair of resistors Ra and Rb, a pair of resistors Rc and Rd, a comparator 427*a*, and a power supply 427*d*. The resistors Ra and Rb function as a divider to produce a fraction of the battery voltage VBAT. The resistors Rc and Rd function as a divider to produce a fraction of the sub-voltage Vs2 produced by the second sub-power supply 415*c*. The comparator 427*a* works to compare a fraction voltage Vo appearing at a junction of the resistors Ra and Rb with a reference voltage Vref that is a fraction voltage appearing at a junction of the resistors Rc and Rd and produce an output signal SC. The power supply circuit 427*b* works to produce the voltage Vs3 from the battery voltage VBAT (5V) and output it to the timer IC 413 when the output signal SC is in a high level. When the fraction voltage Vo is greater than or equal to the reference voltage Vref(Vo≧Vref), the comparator 427*a* provides the output signal SC in the high level to the power supply circuit 427*b*. Therefore, when the fraction voltage Vo is less than the reference voltage Vref(Vo<Vref), the power supply circuit 427*b* does not supply the source voltage Vs3 to the timer IC 413. Resistance ratios of the resistor Ra to Rb and the resistor Rc to Rd are so selected as to meet a condition of Vo<Vref when the battery voltage VBAT drops below a voltage Vb (e.g., 6V) that is set greater than or equal in level to a voltage at which the microcomputer 411 will have a difficulty in writing data in the SRAM 411*a* correctly. For instance, the Ra-Rb resistance ratio is 1:1, and the Rc-Rd resistance ratio is 2:3. Consequently, when the battery voltage VBAT drops below 6V (i.e., the voltage Vb), it inhibits the power supply circuit 427*b* from outputting the source voltage Vs3 to the timer IC 413.

(4) The timer IC 413 is so designed that the count value of the counter 413*a* is reset when the source voltage Vs3 drops below a minimum operating voltage Vt that is a lower limit of a counting range in which the timer IC 413 operates normally. The minimum operating voltage Vt is 3.5V in this embodiment.

Therefore, when the battery voltage VBAT drops below the set voltage Vb, and the fraction voltage Vo drops below the reference voltage Vref, it will cause the output signal SC produced by the comparator 27*a* to be placed in the low level to stop the supply of the source voltage Vs3 from the power supply circuit 427*b* to the timer IC 413. The timer IC 413 is, thus, reset in the count value of the counter 413*a* and then deactivated. This inhibits the microcomputer 411 from being activated by the timer IC 413 if the microcomputer 411 has a difficulty in writing the timer-activated history record in the SRAM 411*a* correctly, thereby ensuring the first decision made when the timer-activated history record as absent in the SRAM 411*a*, but the count value CNT has exceeded the set value Ns. Accordingly, the ECU 1 of this embodiment is operable to eliminate an error in determining that the timer IC 413 is malfunctioning through steps 720 and 740 of FIG. 9.

Figure 14:
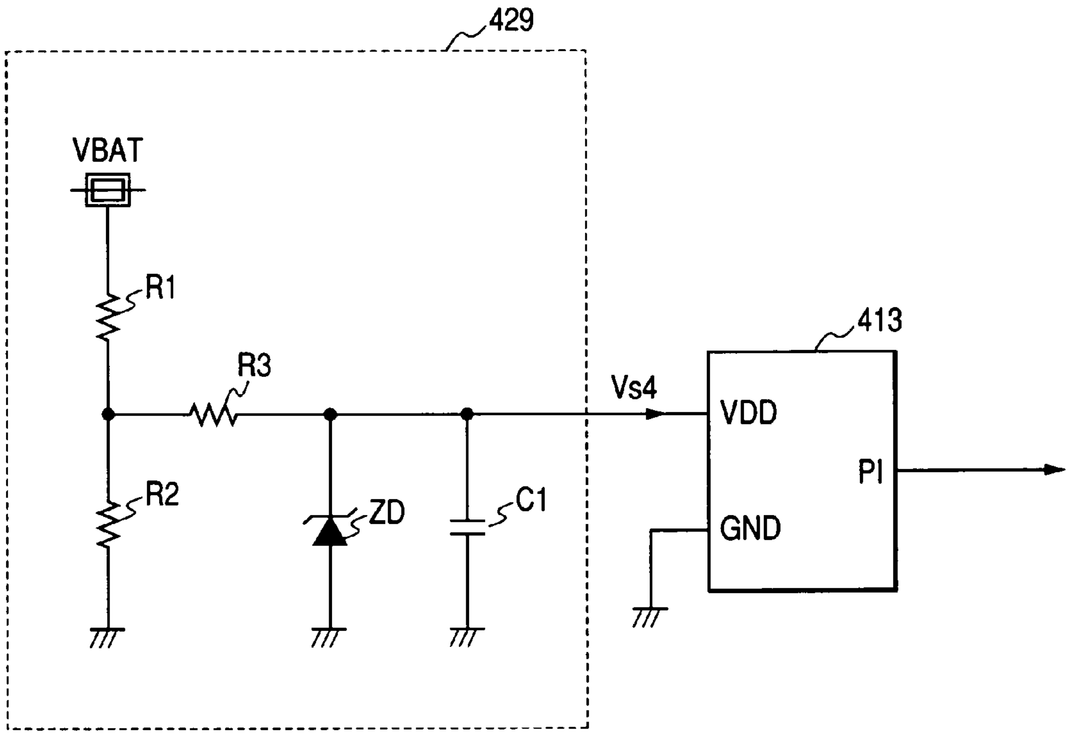
FIG. 14 is a circuit diagram which shows a power supply circuit installed in an engine ECU according to the fourth embodiment of the invention.

The ECU 1 of the fourth embodiment of the invention will be described below. The ECU 1 is equipped with a power supply circuit 429, as illustrated in FIG. 14, instead of the power supply circuit 427 in FIG. 12. Other arrangements are identical with those in the third embodiment.

The power supply circuit 429 includes a pair of resistors R1 and R2 functioning as a divider, a resistor R3, a zener diode ZD, and a capacitor C1. The resistors R1 and R2 works to produce a fraction of the battery voltage VBAT. The resistor R3 is connected at an end to a junction of the resistors R1 and R2 and at the other end to a power source terminal VDD of the timer IC 413. The zener diode ZD is connected at cathode between the resistor R3 and the power source terminal VDD of the timer IC 413 and at anode to ground. The capacitor C1 is connected at an end between the zener diode ZD and the power source terminal VDD of the timer IC 413 and at the other end to ground.

The zener diode ZD is designed to produce a zener voltage Vz of 5V.

A resistance ratio of the resistor R1 to R2 is so selected that a source voltage Vs4 supplied to the timer IC 413 will be lower than the above described minimum operating voltage Vt of the timer IC 413 when the battery voltage VBAT drops below a voltage Vc (e.g., 5.6V) that is set greater in level than the voltage at which the microcomputer 411 encounters a difficulty in writing data in the SRAM 411*a* correctly. For instance, the R1-R2 resistance ratio is 3:5.

When the battery voltage VBAT drops below the set voltage Vc, it will cause the power supply circuit 429 to supply the source voltage Vs4 lower than the minimum operating voltage Vt to the timer IC 413, thereby resetting the count value of the counter 411*a* and deactivating the timer IC 413. The ECU 1 of this embodiment, therefore, works to offer the same beneficial effects as in the second embodiment.

If the ECU 1 in each of the third and fourth embodiments is designed to make the second decision as well as the first decision, it may result in an error in the second decision. Specifically, when the battery voltage VBAT drops below the set voltage Vb after completion of operations of the microcomputer 411 as activated by the timer IC 413, it will cause the count value of the counter 413*a* to be reset. This results in the fact that when the microcomputer 411 is re-started by the ignition switch 13, the timer-activated history record is written in the SRAM 411*a*, but the count value CNT is still smaller than the set value Ns, thus causing the microcomputer 411 to make the second decision in error. For this reason, the ECU 1 of the second embodiment is more effective than in the third and fourth embodiments in accuracy or reliability of diagnosing the timer IC 413.

In the above embodiments, the timer-activated history record, the results of diagnosis of the evaporative purge system, the flag FA, and the diagnostic trouble code are saved in the SRAM 411*a*, but however, another type of memory such as an EEPROM or a flash ROM may alternatively be used for such purpose.

The set voltages Vb and Vc are not limited to the values, as referred to above, and may be selected from a range which ensures that the microcomputer 411 writes data in the SRAM 411*a* correctly.

Figure 15:
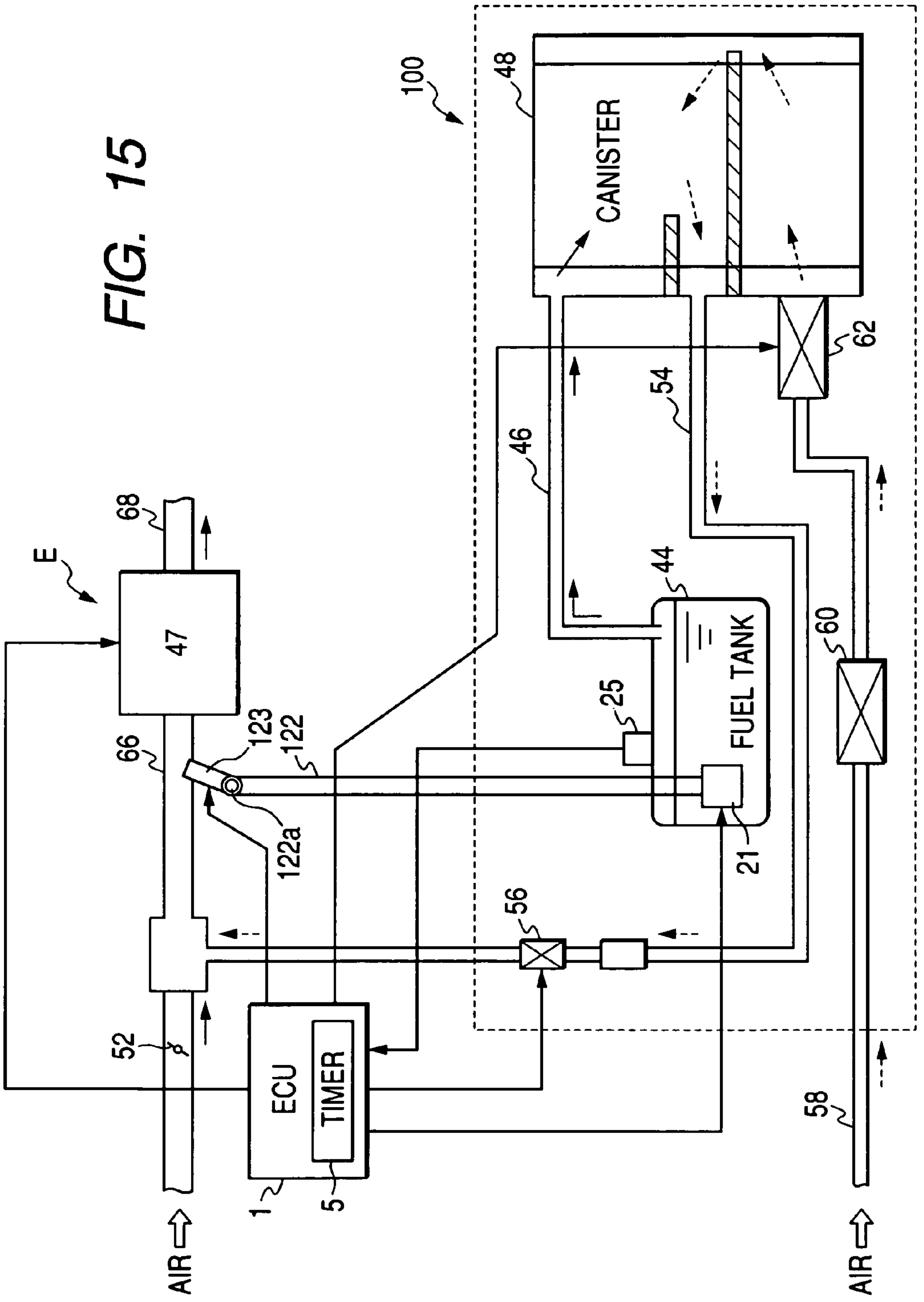
FIG. 15 is a block diagram which shows an engine electronic control unit (ECU) of the fifth embodiment of the invention which is designed to control an evaporative purge system for an automotive vehicle.

FIG. 15 shows the engine ECU 1 according to the fifth embodiment which is designed to diagnose an evaporative purge system 100 upon activation by a soak timer 5 during stop of the engine and also to monitor an operating state of the soak timer 5 in order to eliminate an error in the diagnosis of the evaporative purge system 100. The timer-activated history record and a count value of the soak timer 5 are saved in a nonvolatile memory, as will be describe later in detail, and used for detecting a malfunction of the soak timer 5 upon start-up of the engine.

The evaporative purge system 100 works to supply fuel vapor generated within the fuel tank 44 to the engine E. The engine E is, for example, a four-cylinder gasoline engine equipped with combustion chambers 47 (only one is shown for the brevity of illustration) connecting with inlet paths 66 and exhaust paths 68. The inlet paths 66 have installed therein injectors 123.

The evaporative purge system 100 includes a canister 48, an evaporative emission path 46, and a purge path 54. The canister 48 works to collect fuel vapors as generated within the fuel tank 44. The evaporative emission path 46 connects between the fuel tank 44 and the canister 48. The purge path 54 connects between the canister 48 and the inlet paths 66 and is located downstream of a throttle valve 52. The canister 48 also communicates with the atmosphere through an air inlet path 40 in which an air filter 60 and an electronically-driven pump module 62 are installed. A purge valve 56 is installed in the purge path 54 which is controlled to be opened or closed by the ECU 1 to purge the canister 48 of evaporation gas (i.e., fuel vapor) selectively. The pump module 62 is installed in a joint of the air inlet path 58 to the canister 48 and includes an on/off valve (not shown) which is controlled by the ECU 1 to establish or block communication between the inlet path 58 and the canister 48.

In a usual mode, the canister 48 works to adsorb fuel vapor which is evaporated in the fuel tank 44 and drawn through the evaporative emission path 46. When a given operating condition of the engine E is encountered, the ECU 1 opens the purge valve 56 and the pump module 62 to purge the canister 48 of the fuel vapor and vents it to the inlet paths 66 together with the air entering the canister 48 through the air inlet path 58 wit aid of a vacuum in the inlet path 66.

The evaporative purge system 100 also includes a pressure sensor 25 installed in a top wall of the fuel tank 44. The pressure sensor 25 works to measure the pressure within a circuit made up of the fuel tank 44 and a path(s) communicating with the fuel tank 44 and output a signal indicative thereof to the ECU 1.

When activated by the soak timer 5, the ECU 1 enters a diagnosis mode to diagnose the evaporative purge system 100.

First, the ECU 1 opens the purge path 53 and the on/off valve of the pump module 62. The ECU 1 subsequently activates the pump module 42 to decrease the pressure in the evaporative purge system 100 down to a negative pressure level. Afterwards, the ECU 1 monitors a change in the pressure in the evaporative purge system 100 using an output from the pressure sensor 25 to check the leakage of the fuel vapor leakage from the evaporative purge system 100 arising from, for example, holes or cracks occurring in the canister 48, the evaporative emission path 46, or the fuel tank 44, that is, determine whether the evaporative purge system 100 is malfunctioning or not. If the leakage is occurring, it will cause the ECU 1 to find a change in the pressure, as measured by the pressure sensor 25, to the atmospheric pressure which is faster than usual and determine that the evaporative purge system 100 is malfunctioning.

The fuel in the fuel tank 44 is sucked by the fuel pump 21 and transported to a delivery pipe 122*a* through a fuel supply path 122, which is, in turn, delivered to the injector 123 for each cylinder of the engine E. The injector 123 sprays the fuel into the combustion chamber 47 of the engine E through a corresponding one of the inlet paths 66. The fuel sprayed into the combustion chamber 47 is burned together with the fuel vapor supplied through the purge path 54. Resulting exhaust emissions are discharged to outside the engine E through the exhaust paths 68.

Figure 16:
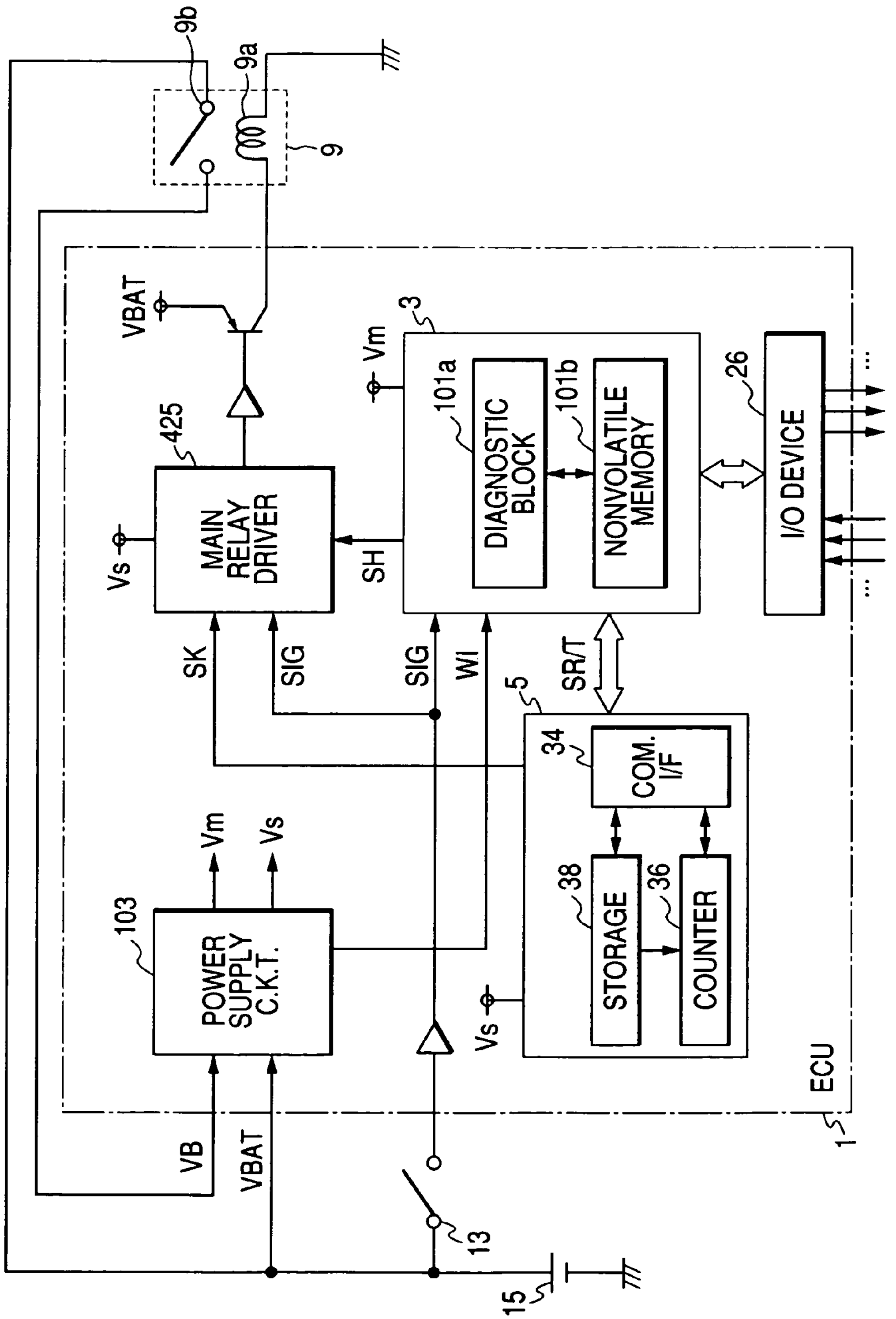
FIG. 16 is a block diagram which shows an internal circuit structure of the ECU, as illustrated in FIG. 15.

FIG. 16 shows an internal structure of the ECU 1 and a peripheral circuit thereof. The same reference numbers, as employed in the above embodiments, will refer to same or similar parts.

The ECU 1 connects with an ignition switch 13, a battery 15, and a main relay 9 and includes a microcomputer 3, a main relay control circuit 425, a power supply circuit 103, the soak timer 5, and an input/output device 26.

The microcomputer 3 works as a host controller in the ECU 1 to perform arithmetic, logic, and decision-making operations to control an operating condition of the engine E and diagnose the evaporative purge system 100. The microcomputer 3 also works to monitor a malfunction of the soak timer 5 and has an nonvolatile memory 38 which stores therein a system activation timer count and an activation history flag, as described later in detail.

The main relay control circuit 425 works as a driver to turn on the main relay 9 in response to input of an start-request signal SK outputted by the soak timer 5 or an ignition on/off signal SIG and turn off the main relay 9 in response to input of an OFF-request signal SH outputted from the microcomputer 3, as will be described later. The main relay 9 is made up of a relay coil 9*a* and a relay contact 9*b*. When the main relay 9 is turned on, the coil 9*a* is energized to bring the contact 9*b* into a closed position, thereby applying the battery voltage VBAT to the power supply circuit 103 as the source voltage VB. Alternatively, when the main relay 9 is turned off, the coil 9*a* is deenergized to bring the contact 9*b* into an open position, thereby cutting the supply of the source voltage VB to the power supply circuit 103.

The power supply circuit 103 is responsive to the source voltage VB to produce an operating voltage Vm for use in operating the microcomputer 3 and receives the battery voltage VBAT directly from the battery 15 to produce an operating voltage Vs for use in operating the main relay circuit 425 and the soak timer 5. When the battery voltage VBAT is lower than a given level, the power supply circuit 103 works to output the write inhibit signal WI to the microcomputer 3.

The soak timer 5 is made up of a communication I/F 34, a counter 36, and a counter-settling storage a device 38 and operates on the operating voltage Vs supplied form the power supply circuit 103 regardless of the on- or off-state of the ignition switch 13.

The counter 36 works as a timer designed to count pulses as produced by, for example, a crystal oscillator (not shown) under control of the communication I/F 34.

The counter-setting storage device 38 stores therein an activation time (will also be referred to as a set value below), as inputted from the microcomputer 3 through the communication I/F 34. The counter-setting storage device 38 is made of, for example, a register. The activation time is a time at which the ECU 1 (i.e., the microcomputer 3) is to be activated after a lapse of a given period of time counted by the soak timer 5.

The communication I/F 34 works as an interface to establish transmission of an activation time setting signal SR and a timer count indicative signal T between the soak timer 5 and the microcomputer 3. The communication I/F 34 also functions to write the set value stored in the storage device 38 and control a counting operation of the counter 36.

The soak timer 5 is also designed to retain a count value shown by the counter 36 upon activation of the ECU 1 by the soak timer 5 as it is as carrying the timer-activated history record which, as described above, indicates the fact that the microcomputer 3 has been activated by the soak timer 5. The communication I/F 34 also functions to monitor a count value of the counter 36 and deactivate the counter 36 when the count value reaches the set value stored in the storage device 38.

The I/O device 26 includes interfaces, an A/D converter, and a driver circuit and communicates between the microcomputer 3 and the fuel pump 21, the pump nodule 62, the purge valve 56, the fuel injectors 123, and the pressure sensor 25 to establish transmission of signals or data therebetween.

Figure 17:
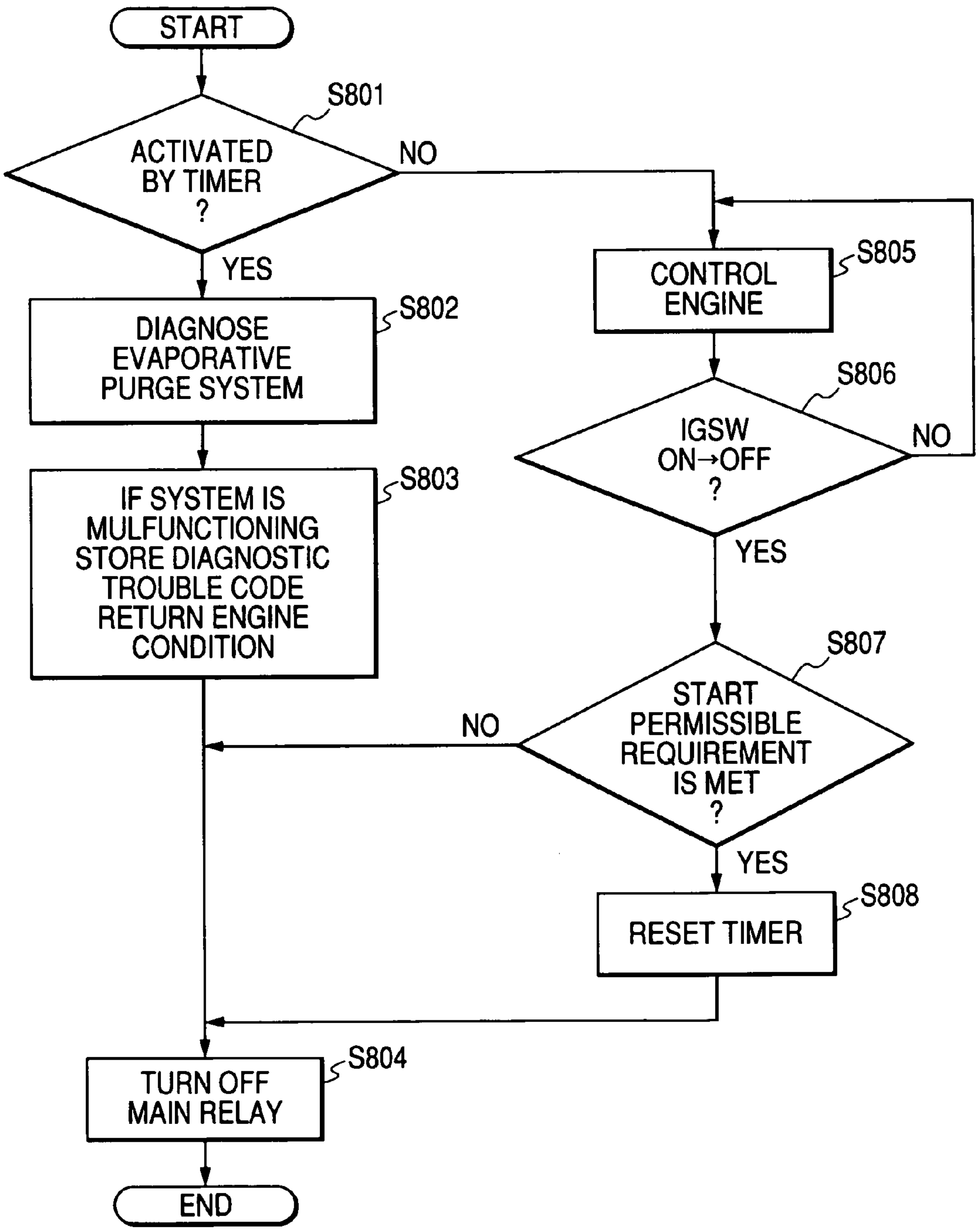
FIG. 17 is a flowchart of a main program in which engine control tasks, a fuel vapor leakage check, a diagnosis task, a timer activation task, etc. are to be executed by a microcomputer of the ECU of FIG. 16.

FIG. 17 is a flowchart of a main program to be executed by the microcomputer 3 each activation of the ECU 1.

After entering the program, the routine proceeds to step 801 wherein it is determined whether the microcomputer 3 has been started by the operation of the soak timer 5 or not. This determination is made by checking the fact that the microcomputer 3 is operating, and the ignition on/off signal SIG indicates the off-state of the ignition switch 13.

If a YES answer is obtained in step 801 meaning that the microcomputer 3 has been activated by the soak timer 5, not by the ignition switch 13, then the routine proceeds to step 802 to diagnose the evaporative purge system 100 in the manner, as described above. The routine proceeds to step 803 wherein if the evaporative purge system 100 is determined to be malfunctioning, the microcomputer 3 stores a diagnostic trouble code indicating such an event in the nonvolatile memory **101*b*, and returns an engine load (e.g., a position of the throttle valve 52) to an initial one as provided upon the start of the ECU 1. The routine proceeds to step 804 wherein the microcomputer 3 outputs the OFF-request signal SH to turn off the main relay control circuit 425. This causes the main relay 9 to be opened to block the supply of the source voltage VB to the power supply circuit 103, so that the microcomputer 3** is deactivated.

Alternatively, if a NO answer is obtained in step 801 meaning that the activation of the microcomputer 3 is achieved by turning on the ignition switch 13, then the routine proceeds to step 805 wherein given engine controls are performed during the on-state of the ignition switch 13.

The routine proceeds to step 806 wherein it is determined whether the ignition switch 13 is turned off or not. If a NO answer is obtained meaning that the ignitions witch 13 is still in the on-state, the routine returns back to step 805 to continue the engine controls. Alternatively, if a YES answer is obtained meaning that the ignition switch 13 is in the off-state, the routine proceeds to step 807 wherein it is determined whether a given operation start permissible requirement for starting the host microcomputer 3 through the soak timer 5 is met or not. For example, it is determined whether a timer failure history record (i.e., a diagnostic trouble code) is stored in the memory **101*b* or not which indicates a failure in operation of the soak timer 5. If the timer failure history record is not stored in the memory 101*b*, a YES answer is obtained in step 807. The routine then proceeds to step 808 to reset the soak timer 5. Specifically, the microcomputer 3 outputs the activation time setting signal SR indicative of a set count value and a counter clear request signal to the communication I/F 34. The communication I/F 34 sets the count value (i.e., the activation time), as carried by the activation time setting signal SR, in the storage device 38 and clears the counter 36. Subsequently, the routine proceeds to step 804 wherein the main relay 9** is turned off.

Figure 18:
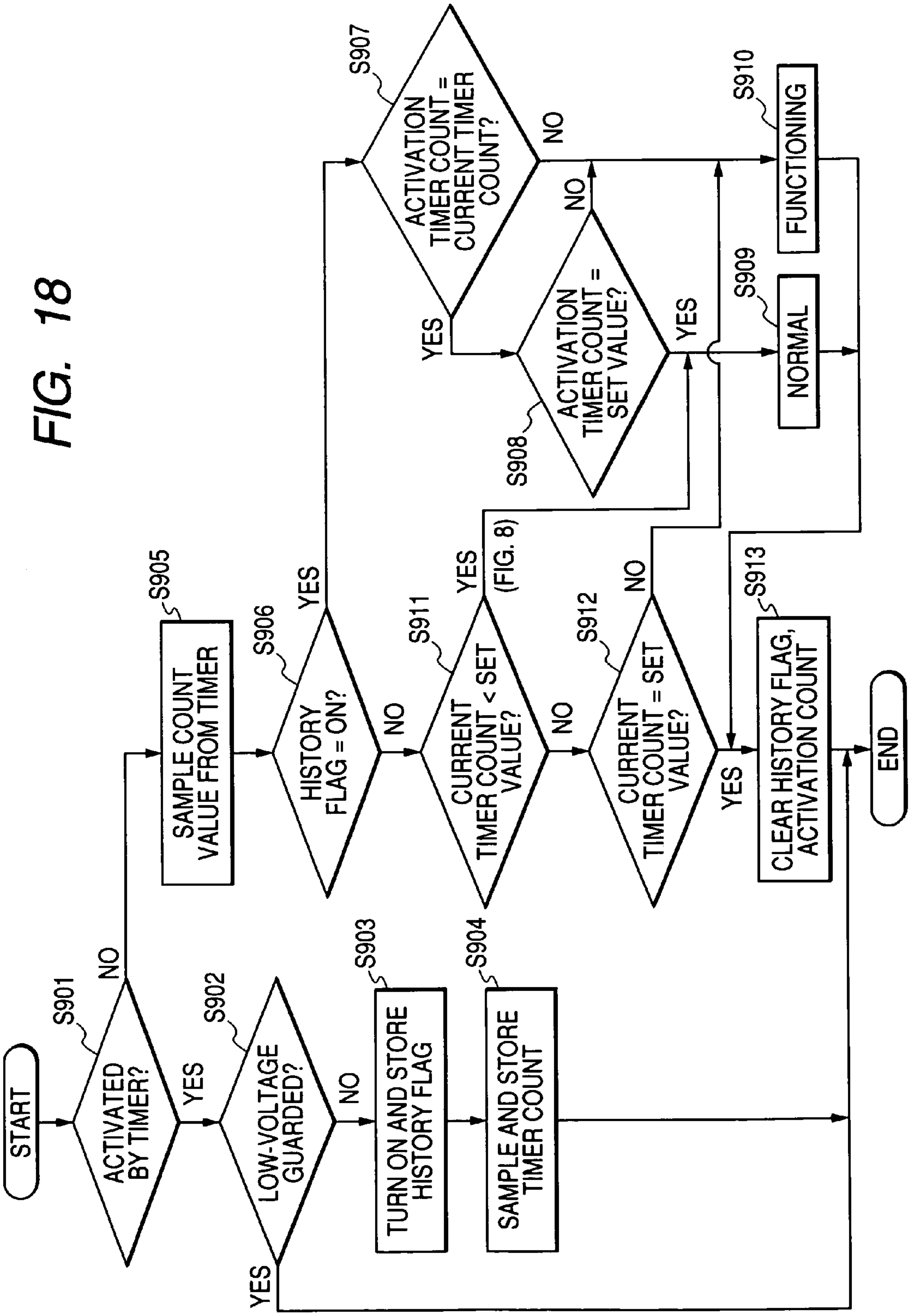
FIG. 18 is a flowchart of a timer malfunction diagnostic program to be executed each activation of the ECU of FIG. 16.

FIG. 18 is a flowchart of a timer diagnosis program to be executed by the microcomputer 3 upon each activation of the ECU 1 to diagnose the soak timer 5.

After entering the program, the routine proceeds to step 901 wherein it is determined whether the microcomputer 3 has been activated by the soak timer 5 or not. This determination is achieved, like step 701, by monitoring the ignition on/off signal SIG. At this time, if the soak timer 5 is in a condition to operate normally, the counter 36 will be at rest.

If a YES answer is obtained meaning that the microcomputer 3 has been started by the soak timer 5, then the routine proceeds to step 902 wherein it is determined whether the microcomputer 3 is low-voltage guarded or not, that is, whether the write inhibit signal WI is in the active level or not. When the operating voltage Vm is blow a lower limit of a voltage range which ensures correct operation of the microcomputer 3, the write inhibit signal WI is placed in the active level to inhibit the microcomputer 3 from diagnosing the soak timer 5. Alternatively, if a NO answer is obtained in step 902 meaning that the write inhibit signal WT is in the passive level, then the routine proceeds to step 903 wherein the activation history flag is turned on and stored in the nonvolatile memory **101*b* of the microcomputer 3. The routine proceeds to step 904 wherein the system activation timer count that is a final count value, as retained in the counter 34 at the start of the ECU 1, is read out of the soak timer 5 and stored in the memory 101*b* of the microcomputer 3**.

Alternatively, if a NO answer is obtained in step 910 meaning that the microcomputer 3 has been started by turning on the ignition switch 13, then the routine proceeds to steps 905 to 912 to determine whether a malfunction of the soak timer 5 is detected or not or whether such detection is suspended or not.

Specifically, in step 905, the microcomputer 3 samples a count value the counter 36 of the soak timer 5 shows currently and stores it as a current timer count in a data memory (not shown) such as a RAM.

The routine proceeds to step 906 wherein it is determined whether the activation history flag, as stored in the memory **101*b*, is in the on-state or not. If a YES answer is obtained, then the routine proceeds to step 907 wherein the system activation timer count, as stored in the memory 101*b*, is identical with the current timer count stored in step 905 or not. If a YES answer is obtained, then the routine proceeds to step 908 wherein it is determined whether the system activation timer count is identical with the set value or not which is provided by the microcomputer 3 to be stored in the storage device 38**.

Figure 19:
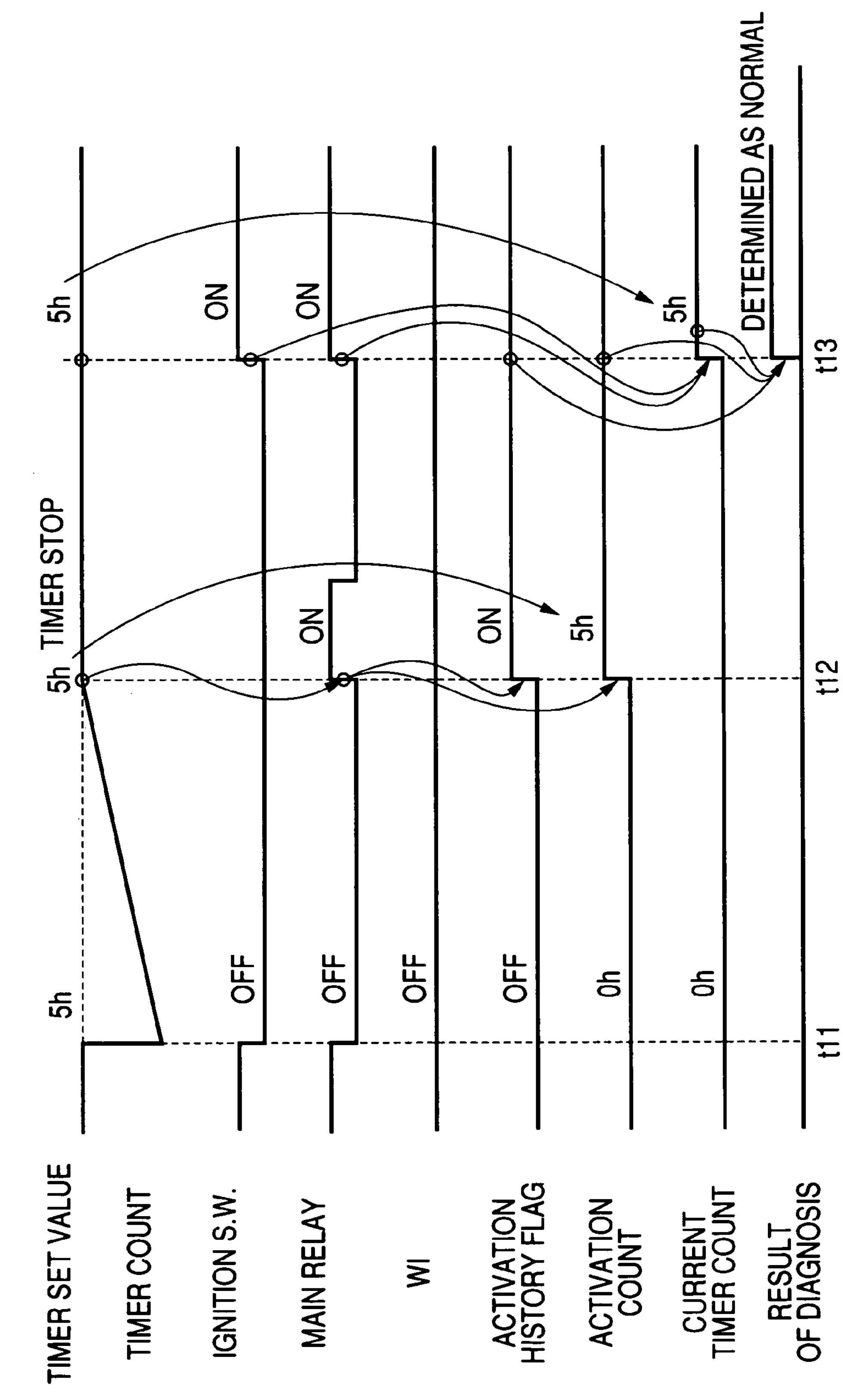
FIG. 19 is a time chart which represents ignition- and timer-activated operations of the ECU of FIG. 16 when a timer circuit is determined to be operating normally.

If a YES answer is obtained in step 908, then the routine proceeds to step 909 wherein it is determined that the soak timer 5 is in the condition to function properly, and the ECU 1 has been started normally upon expiry of the activation time. This will be described below with reference to FIG. 19.

When the ignition switch 13 is turned off, so that the main relay 9 is opened at time t11, the soak timer 5 turns on the counter 34 to start counting. In this embodiment, the activation time is set to five (5) hours.

When a count value of the counter 36, i.e., time elapsed after the counter 36 has started counting, reaches the set value (i.e., the activation time) stored in the storage device 38 at time t12, the soak timer 5, as described above, stops the counting of the counter 36. Simultaneously, the soak timer 5 outputs the start-request signal SK to turn on the main relay control circuit 425, thereby activating the ECU 1 (i.e., the microcomputer 3). The microcomputer 3 then turns on the activation history flag and saves it in the nonvolatile memory 101*b* along with the system activation timer count (5 hours). During the on-state of the main relay 9, the evaporative purge system 100 is, as described above, diagnosed.

When the ignition switch 13 is turned on, so that the main relay 9 is closed to activate the ECU 1 again at time t13, the microcomputer 3 determines whether the following conditions are met or not: (1) the activation history flag set in the on-state is stored in the memory 101*b* (step 906), (2) the system activation timer count, as stored in the memory 101*b*, is identical with the current timer count stored in the microcomputer 3 (step 907), and (3) the system activation timer count is identical with the set value stored in the storage device 38 of the soak timer 5 (step 908). If these conditions are met, the microcomputer 3 determines in step 909 that the soak timer 5 is not malfunctioning.

Afterwards, the microcomputer 5 clears, in step 913, the activation history flag and the system activation timer count stored in the memory 101*b* and complete the timer diagnosing operation.

Figure 20:
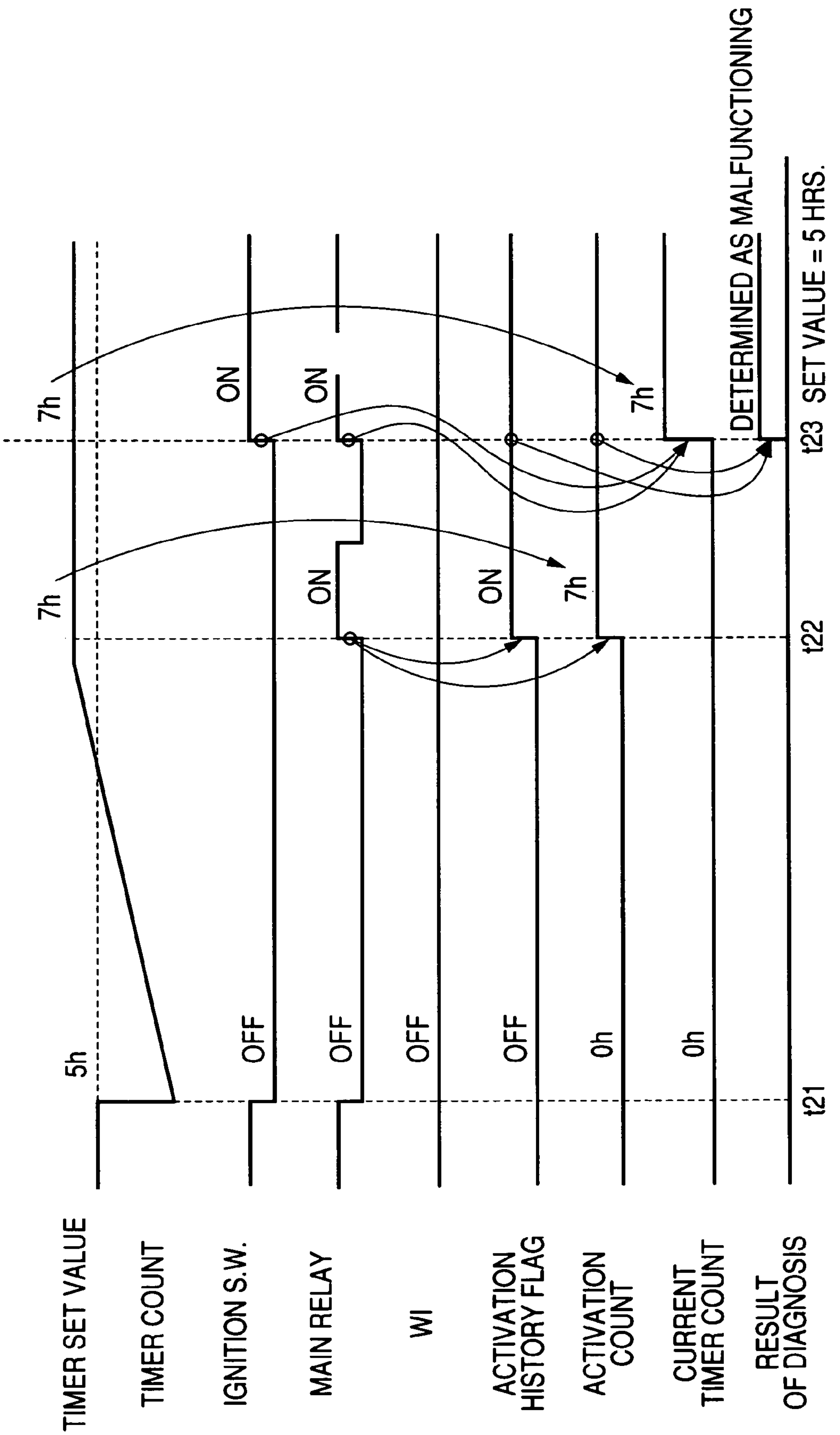
FIGS. 20 and 21 are time charts which represent ignition- and timer-activated operations of the ECU of FIG. 16 when a timer circuit is determined to be malfunctioning based on different diagnostic conditions.

Referring back to FIG. 18, if a NO answer is obtained in step 908 meaning that the system activation timer count is not identical with the set value stored in the storage device 38, the routine proceeds to step 910 wherein it is determined that the soak timer 5 has failed in operation. This will also be described with reference to FIG. 20.

When the ignition switch 13 is turned off, so that the main relay 9 is opened at time t21, the soak timer 5, as already described, starts the counter 36 counting the time. If the set value (i.e., five hours) in the storage device 38 is already reached, but the counter 34 is not stopped in error so that it continues counting, and the ECU 1 is activated by the soak timer 5 two hours later at time 22 (seven (7) hours elapsed since time t21), the microcomputer turns on the activation history flag and saves it in the memory 101*b* along with the system activation timer count indicating seven (7) hours.

Afterwards, if the ECU 1 is activated again upon turning on of the ignition switch 13 at time t23, the microcomputer 3 determines that the following conditions are met: (1) the activation history flag set in the on-state is stored in the memory 101*b* (step 906), (2) the system activation timer count (i.e., seven hours), as stored in the memory 101*b*, is identical with the current timer count stored in the microcomputer 3 (step 907), and (3) the system activation timer count (i.e., seven hours) is not identical with the set value (i.e., five hours) stored in the storage device 38 of the soak timer 5 (step 908). The microcomputer 3 then determines in step 910 that the soak timer 5 has failed in operation. Such a failure event is saved in a diagnosis storage location in the memory 101*b* as the failure history record which is to be looked up in step 807 of FIG. 17.

Afterwards, the microcomputer 5 clears, in step 913, the activation history flag and the system activation timer count stored in the memory 101*b* and complete the timer diagnosing operation.

Figure 21:
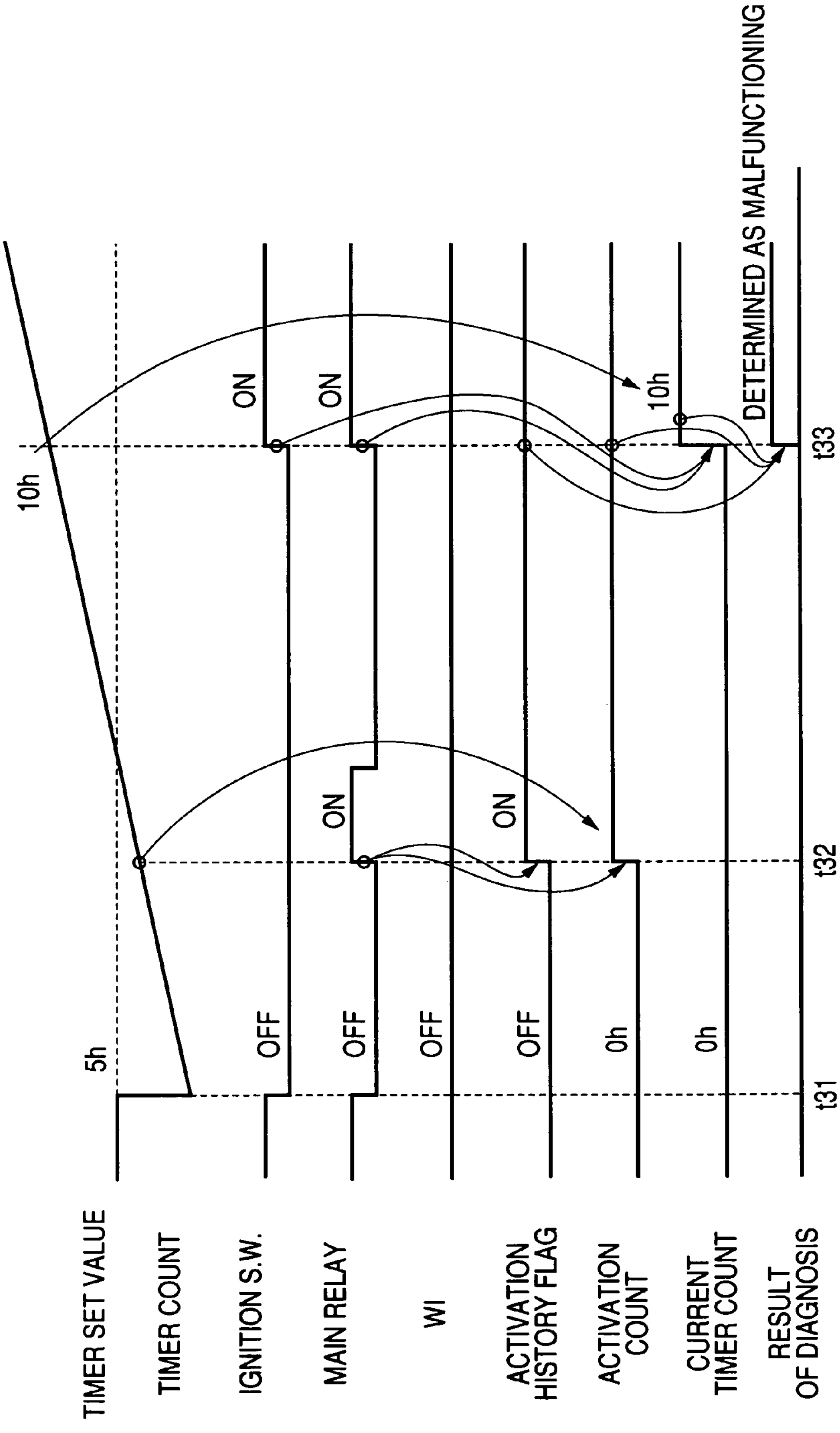

Referring back to FIG. 18, if a NO answer is obtained in step 907 meaning that the system activation timer count is not identical with the current timer count, then the routine proceeds to step 910 wherein it is determined that the soak timer 5 has failed in operation. This will also be described below with reference to FIG. 21.

When the ignition switch 13 is turned off, so that the main relay 9 is opened at time t31, the soak timer 5, as already described, starts the counter 36 counting the time. If the soak timer 5 outputs the start-request signal SK in error to the main relay control circuit 425 at time t32 before the set value (i.e., five hours) in the storage device 38 is reached, and the soak timer 5 as failing in stopping the counter 36, the ECU 1 is activated, so that the turns on the activation history flag and saves it in the memory 101*b* together with the system activation timer count indicating n hours less than five (5) hours.

Afterwards, if the ECU 1 is activated again upon turning on of the ignition switch 13 at time t33, and a count value the counter 36 shows currently (i.e., the current timer court) indicates, for example, ten (10) hours, the microcomputer 3 determines that the following conditions are met: (1) the activation history flag set in the on-state is stored in the memory 101*b* (step 906) and (2) the system activation timer count (i.e., n hours less than five hours), as stored in the memory 101*b*, is not identical with the current timer count (ten hours) stored in the microcomputer 3 (step 907). The microcomputer 3 then determines in step 910 that the soak timer 5 has failed in operation. Such a failure even, is saved in the diagnosis storage location in the memory 101*b* as the failure history record which is to be looked up in step 807 of FIG. 17.

Afterwards, the microcomputer 5 clears, in step 913, the activation history flag and the system activation timer count stored in the memory 101*b* and complete the timer diagnosing operation.

Referring back to FIG. 18, if a NO answer is obtained in step 906 meaning that the activation history flag is placed in the off-state, any one of the following conditions is considered to be met: (a) the ECU 1 has been activated by turning on the ignition switch 13 before a count value of the counter 36 reaches the set value stored in the storage device 38, (b) a count value of the counter 36 reached the set value, but the ECU 1 was still kept deactivated in error for some reason, and (c) the main relay 9 failed to be turned on by the soak timer 5 or the write inhibit signal WI was outputted from the power supply circuit 103 due to an undesirable drop in the battery voltage VBAT. The three conditions (a), (b), and (c) will be analyzed below in detail.

Figure 22:
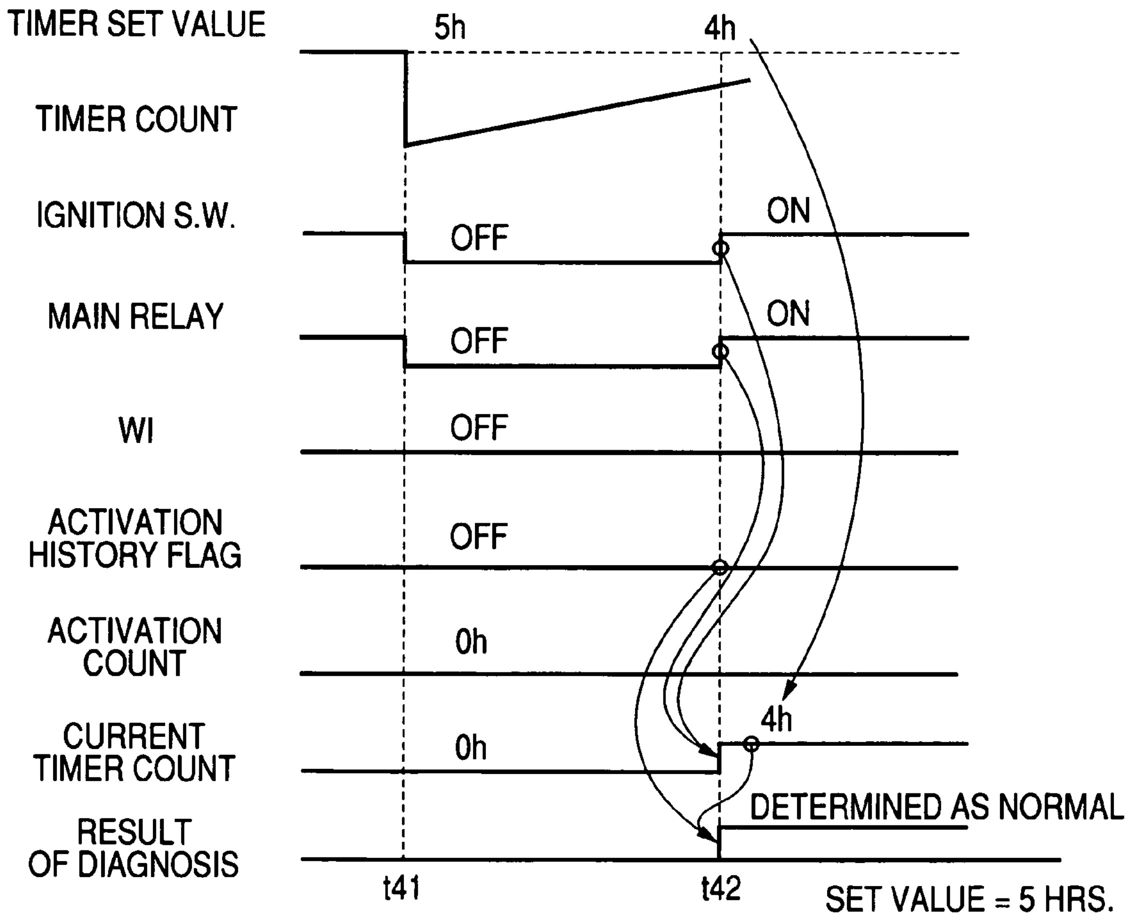
FIG. 22 is a time chart which represents ignition- and timer-activated operations of the ECU of FIG. 16 when a timer circuit is determined to be operating normally.

If a count value shown by the counter 36 upon activation of the ECU 1 is less than the set value in the storage device 38, the microcomputer 3 may determine that the condition (a) is met, and the soak timer is operating normally. Referring to FIG. 18, if a YES answer is obtained in step 911, when the routine proceeds to step 909 wherein the soak timer 5 is in the normal condition. This will also be described below with reference to FIG. 22.

When the ignition switch 13 is turned off, so that the main relay 9 is opened at time t41, the soak timer 5, as already described, starts the counter 36 counting the time. If the ignition switch 13 is turned on again to activate the ECU 1 at time t42 which is four (4) hours later than time t41 before an instantaneous count value of the counter 36 does not yet react the set value (i.e., five hours), the microcomputer 3 determines in step 911 that the count value (i.e., the current timer count) is less than the set value and in step 909 that the soak timer 5 is operating normally.

Afterwards, the microcomputer 5 clears, in step 913, the activation history flag and the system activation timer count stored in the memory 101*b* and complete the timer diagnosing operation.

In the event that the condition (b) is encountered, the microcomputer 3 determines that the set value was reached, but the ECU 1 was not activated and that the soak timer 5 has failed in operation. In this case, it may be considered that the soak timer 5 failed to perform functions of stopping the counter 36 from counting the time and outputting the start-request signal SK to the main relay control circuit 425. This will also be described with reference to FIG. 23.

Figure 23:
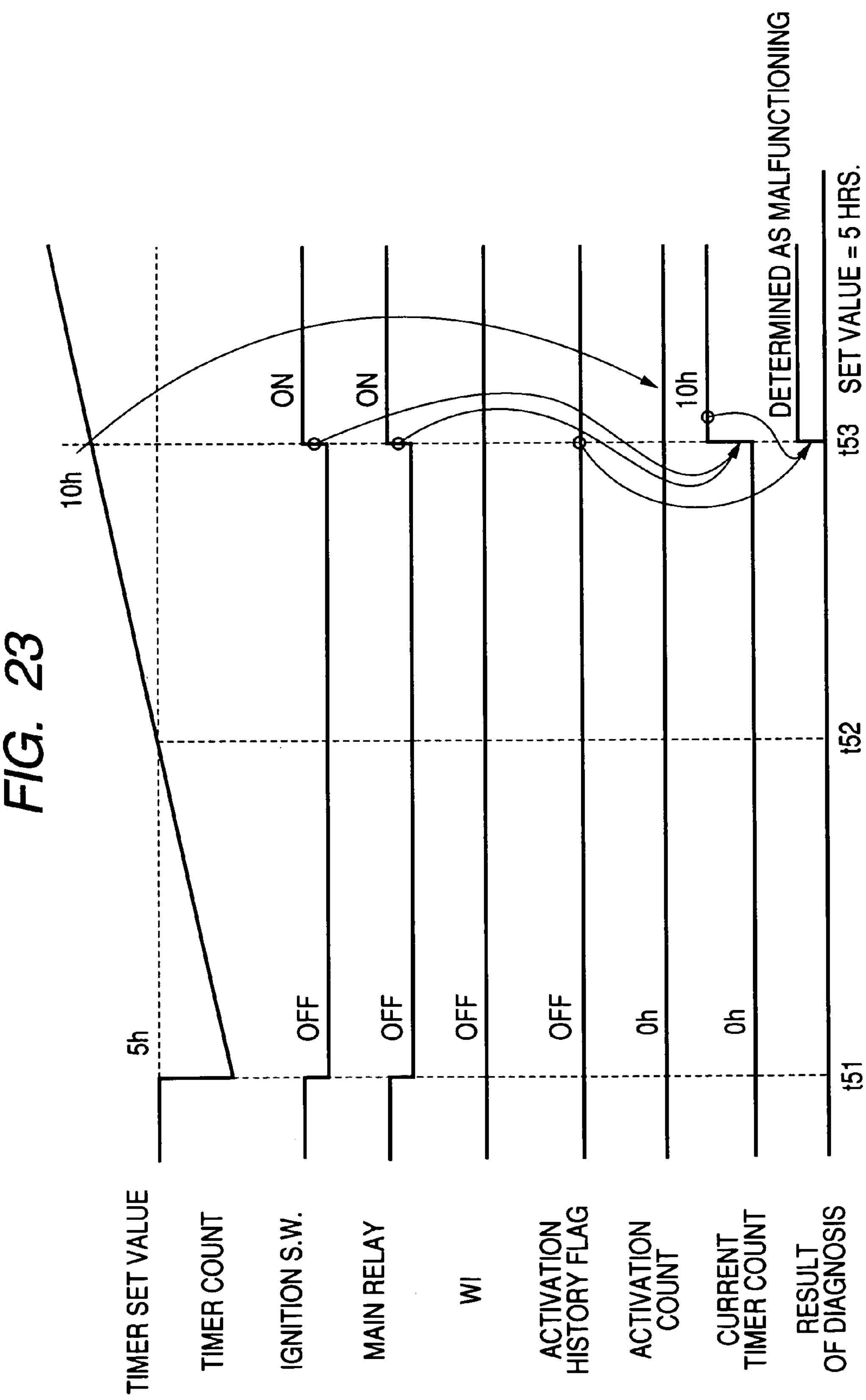
FIG. 23 is a time chart which represents ignition- and timer-activated operations of the ECU of FIG. 16 when a timer circuit is determined to be malfunctioning.

FIG. 23 demonstrates the case where the soak timer 5 has started counting at time t51, but not been stopped, and the start-request signal SK has not been outputted at time t52. In this event, if the ECU 1 is activated following turning on of the ignition switch 13 at time t53 ten (10) hours later than time t51, an instantaneous count value of the counter 34 shows ten (10) hours that is greater than the set value (i.e., five (5) hours). If such a case is encountered, NO answers are obtained both in steps 911 and 912 of FIG. 18. The microcomputer 3, thus, determines in step 910 that the soak timer is failing in operation. Such a failure event is saved in the diagnosis storage location in the memory 101*b* as the failure history record which is to be looked up in step 807 of FIG. 17.

Afterwards, the microcomputer 5 clears, in step 913, the activation history flag and the system activation timer count stored in the memory 101*a* and complete the timer diagnosing operation.

Figure 24:
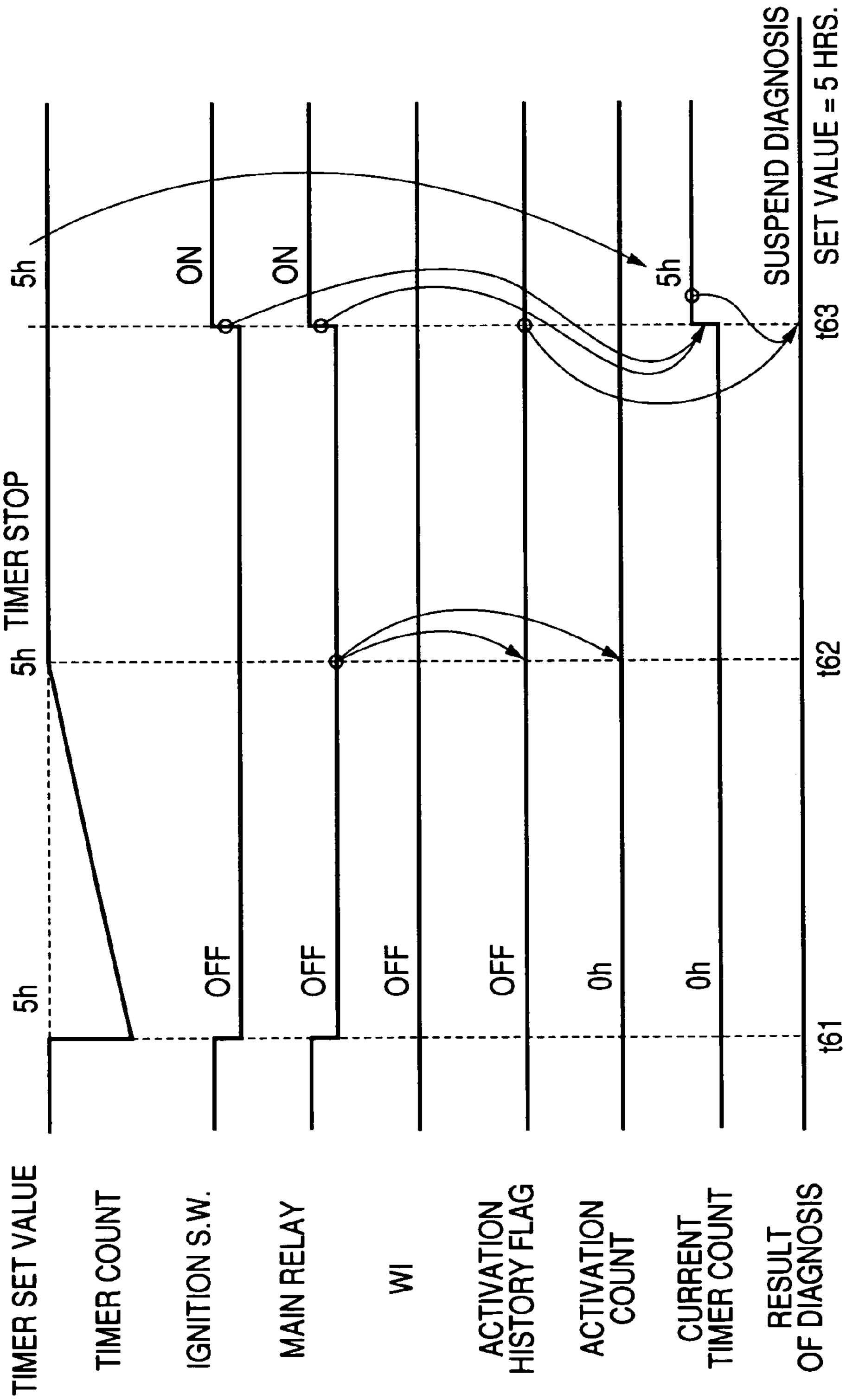
FIGS. 24 and 25 are time charts which represent ignition- and timer-activated operations of the ECU of FIG. 16 in cases where a determination of whether a timer circuit is malfunctioning or not should not be made.
Figure 25:
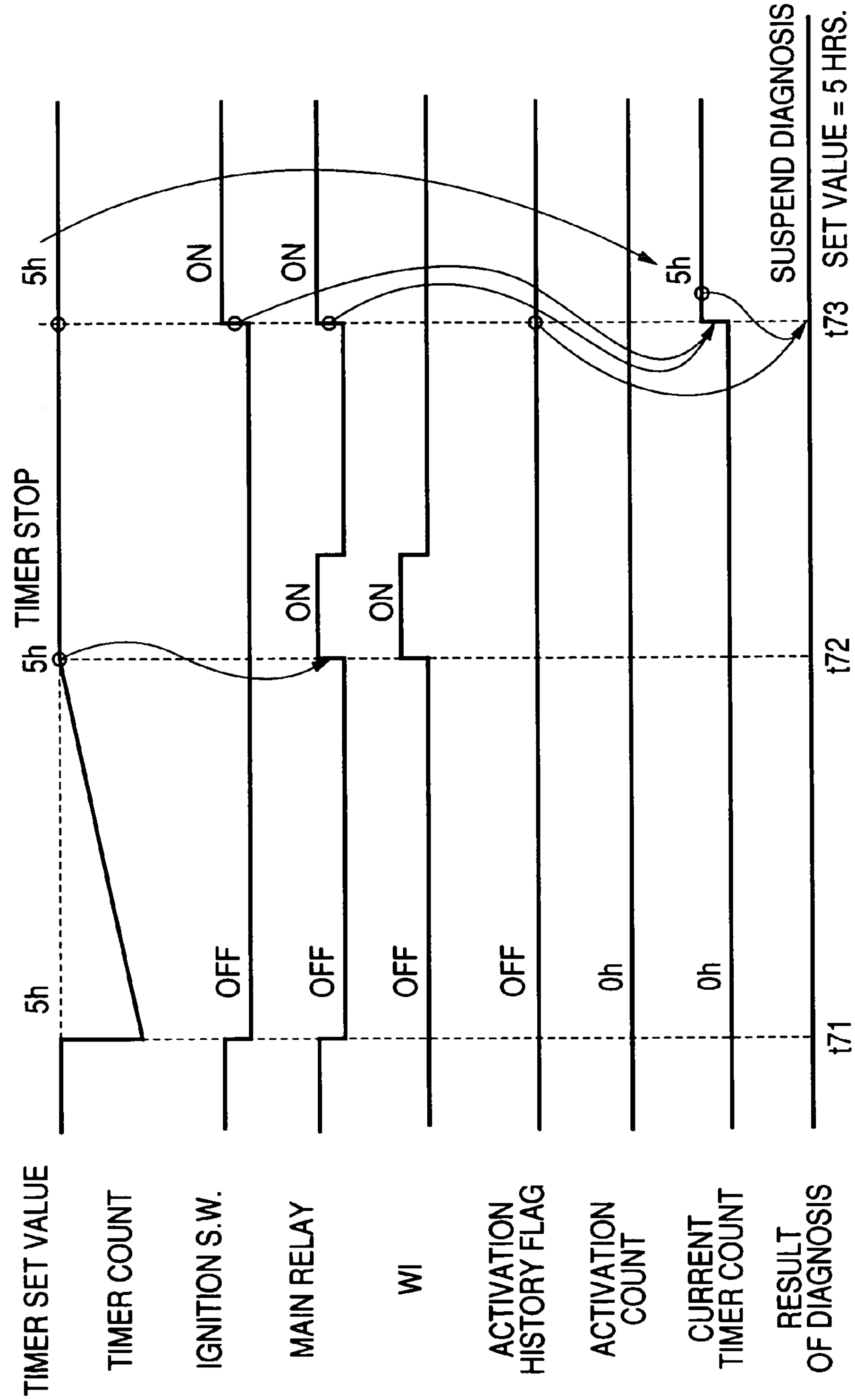

The condition (c) is caused by an unwanted drop in the battery voltage VBAT. It is, thus, undesirable to determine whether the soak timer 5 is malfunctioning or not. FIGS. 24 and 25 demonstrate specific examples where the condition (c) is encountered.

FIG. 24 illustrates for the case where a drop in the battery voltage VBAT results in a failure in turning on the main relay 9.

In the illustrated example, the soak timer 5 has started the counter 36 counting the time at time t61. The counter 36 has been stopped normally, and the start-request signal SK has been outputted at time t62 that is five (5) hours later than time t61, but the battery voltage VBAT has dropped undesirably. Such an event may result in a failure in turning on the main relay 9 to activate the ECU 1. In this case, the activation history flat and the system activation timer count are not stored in the memory 101*b*.

If the battery voltage VBAT is returned to a level enough to turn on the main relay 9, and the ignition switch 13 is turned on to activate the ECU 1 at time t63, the activation history flag is still placed in the off-state, but a count value (five hours) shown by the counter 36 matches the set value (five hours).

If the above event has occurred, a YES answer is obtained in step 912. The microcomputer 3, thus, clears in step 913 the activation history flag and the system activation timer count stored in the memory 101*b* without determining whether the soak timer 5 is malfunctioning or not.

FIG. 25 illustrates for the case where a drop in the battery voltage VBAT results in output of the write inhibit signal WI.

In the illustrated example, the soak timer 5 has started the counter 36 counting the time at time t71. The counter 36 has been stopped normally, and the start-request signal SK has been outputted at time t72 that is five hours later than time t71, but the battery voltage VBAT has dropped undesirably. If the main relay 9 is turned on at time t72, it may result in output of the write inhibit signal WI to inhibit the microcomputer 3 from saving the activation history flag and the current timer count in the memory 101*b*.

If the battery voltage VBAT is returned to a level enough to eliminate the need for the power supply circuit 103 to output the write inhibit signal WI, and the ignition switch 13 is turned on to activate the ECU 1 at time t73, the activation history flag is still placed in the off-state, but a count value (five hours) shown by the counter 36 matches the set value (five hours).

If the above event has occurred, a YES answer is obtained in step 912. The microcomputer 3, thus, clears in step 913 the activation history flag and the system activation timer count stored in the memory 101*b* without determining whether the soak timer 5 is malfunctioning or not.

As apparent from the above discussion, the ECU 1 of the fifth embodiment is designed to stop the counter 36 of the soak timer 5 from counting upon activation of the ECU 1 by the soak timer 5. Consequently, as long as the soak timer 5 is in a normal condition, a count value the counter 36 shows upon the activation of the ECU 1 by the soak timer 5 is retained in the counter 36 as it is. This retaining is ensured as long as an output voltage of the in-vehicle battery 15 is low, but the power supply circuit 103 is operable to assure an amount of electricity sufficient to operate the soak timer 5 normally. Therefore, if any problem of the type, as discussed above, has occurred in the ECU 1 due to a drop in the output voltage of the battery 15, but the soak timer 5 has no trouble, the count value is held in the counter 36 as being identical with the activation time (i.e., the set value), as described above. This enables the microcomputer 3 to diagnose a malfunction of the soak timer 5 with a high reliability level by sampling and analyzing the count value retained in the counter 36.

The diagnosis of the malfunction of the soak timer 5 is achieved by checking matching between a count value (referred to above as the system activation timer count) shown by the counter 36 upon activation of the ECU 1 by the soak timer 5 and a count value (referred to above as the current timer count) shown by the counter 36 upon activation of the ECU 1 by turning on the ignition switch 13. Specifically, upon activation of the ECU 1 by the ignition switch 13, the microcomputer 3 works to determine whether the system activation timer count snatches the current timer count or not under the condition that the activation history record is present which indicates the ECU 1 has been activated by the soak timer 5 (step 907). If the soak timer 5 is not malfunctioning, a count value of the counter 36 upon activation of the ECU 1 by the soak timer 5 is retained in itself as it is. Therefore, unless the output voltage of the battery 15 drops undesirably, the count value of the counter 36 is recorded as it is in the nonvolatile memory 101*b* as the system activation timer count. If the system activation timer count is identical with the current timer count upon subsequent activation of the ECU 1 by turning on the ignition switch 13, it allows the microcomputer 3 to determine that the soak timer 5 is operable normally unless the ECU 1 has been activated at a time different from that preset in the soak timer 5. Alternatively, if the system activation timer count is different from the current timer count upon subsequent activation of the ECU 1 by turning on the ignition switch 13, it may be viewed as arising from, for example, the trouble that the counter 36 has not been stopped upon expiry of the preset time or continues to counting, thus allowing the microcomputer 3 to determine that the soak timer 5 is malfunctioning. In a case where the count value of the counter 36 were not recorded in the nonvolatile memory 101*b* or the main relay 9 failed to be turned on due to a drop in the output voltage of the battery 13, the microcomputer 3 will find that the system activation timer count is not recorded in the memory 101*b* and it is impossible to diagnose the malfunction of the soak timer 5. The microcomputer 3, thus, suspends the determination of whether the soak timer 5 is malfunctioning or not.

The microcomputer 3 is also designed to diagnose the malfunction of the soak timer 5 by checking matching between the system activation timer count and the time preset in the soak timer 5 (referred to above as the set value). Specifically, the diagnosis is achieved by checking matching between the system activation timer count and the current timer count upon activation of the ECU 1 by turning on the ignition switch 13 under the condition that the activation history record is present (step 908). If the soak timer 5 is not malfunctioning, a count value of the counter 36 upon activation of the ECU 1 by the soak timer 5 is, as already described, retained in itself as it is. Therefore, unless the output voltage of the battery 15 drops undesirably, the count value of the counter 36 is recorded as it is in the nonvolatile memory 101*b* as the system activation timer count. If the system activation timer count, as stored in the memory 101*b*, is identical with the current timer count as sampled upon activation of the ECU 1 by turning on the ignition switch 13, but the ECU 1 has been activated at a time different from that preset in the soak timer 5, it results in a difficulty in diagnosing the soak timer 5 correctly. This problem is, however, eliminated by checking matching between the system activation timer count and the time preset in the soak timer 5. Specifically, if both are identical with each other, it allows the microcomputer 3 to determine that the soak timer 5 is operable normally. If not, it allows the microcomputer 3 to determine that the soak timer 5 is malfunctioning. In a case where the count value of the counter 36 were not recorded in the nonvolatile memory 101*b* or the main relay 9 failed to be turned on due to a drop in the output voltage of the battery 13, the microcomputer 3 will find that the system activation timer count is not recorded in the memory 101*b* and it is impossible to diagnose the malfunction of the soak timer 5. The microcomputer 3, thus, suspends the determination of whether the soak timer 5 is malfunctioning or not.

The microcomputer 3 is also designed to monitor the presence of the activation history flag in the nonvolatile memory 101*b* upon activation of the ECU 1 by the ignition switch 13 (step 906). The activation history flag is recorded in the memory 101*b* unless the output voltage of the battery 15 drops undesirably. The use of this fact in checking the above described matching between the current timer count and the preset time increases the reliability of determination of whether it is possible to diagnose the malfunction of the soak timer 5 accurately or not without need for monitoring the system activation timer count.

Specifically, if it is determined that the activation history flag is absent in the memory 101*b*, the microcomputer 3 performs the diagnosis of the soak timer 5 using a relation between the current timer count and the preset time in the soak timer 5 (steps 911 and 912). Unless the soak timer 5 is malfunctioning, the count value of the counter 36 is, as described above, retained in itself as it. Therefore, when the ECU 1 has been activated upon expiry of the time preset in the soak timer 5, it will result in agreement of a count value shown by the soak timer 5 upon such activation with the preset time. If the above parameters, i.e., the current timer count and the preset time match each other upon activation of the ECU 1 by the ignition switch 13, it allows the microcomputer 3 to at least determine that the ECU 1 has been activated properly by the soak timer 5. Alternatively, if the current timer count and the preset time disagree with each other, it may be viewed as arising from the trouble that the counter 36 has not been stopped upon expiry of the preset time, thus allowing the microcomputer 3 to determine that the soak timer 5 is malfunctioning. However, the ECU 1 might have been activated by the ignition switch 13 before expiry of the preset time in the soak timer 5. In such an event, a count value shown by the counter 36 upon the activation of the EUC 1 by the ignition switch 13 will be smaller than the preset time unless the soak timer is malfunctioning, thus allowing the microcomputer 3 to determine that the soak timer 5 is functioning properly.

The activation history flag is, as described above, recorded in the nonvolatile memory 101*b* if the output voltage of the battery 15 has not dropped undesirably. Accordingly, in the absence of the activation history flag in the memory 101*b*, the microcomputer 3 may suspend the diagnosis of the soak timer 5, but however, if it is found that a count value shown by the counter 36 upon the activation of the EUC 1 by the ignition switch 13 is smaller than the preset time, it allows the microcomputer 3 to determine that the soak timer 5 is operating properly. Alternatively, if the above fact is not admitted, but it is found that the count value shown by the counter 36 upon the activation of the EUC 1 by the ignition switch 13 disagrees with the preset time (step 912), it allows the microcomputer 3 to determine that the soak timer 5 is malfunctioning.

The soak timer 5 is designed to stop the counter 36 counting by itself. This ensures the stability of stopping the counting in the counter 36 as long as a sufficient amount of power is supplied to the soak timer 5.

In the event that the soak timer 5 is determined to be malfunctioning, the microcomputer 3 works to inhibit the ECU 1 from being activated by the soak timer 5 (step 807 in FIG. 17). Specifically, if it is determined that the soak timer 5 is malfunctioning, the microcomputer 3 stops the ECU 1 from being activated by the soak timer 5 to diagnose the fuel vapor leakage in the evaporative purge system 100, thus minimizing error in such diagnosis.

The diagnosis of the soak timer 5 may alternatively be achieved in the following manners.

The activation time, i.e., the time preset in the soak timer 5 is five (5) hours in the above embodiments, but can be of any value.

The nonvolatile memory 101*b* may be implemented by an EEPROM, EPROM, or standby RAM which is battery-backed up. The nonvolatile memory 101*b* may also be disposed outside the microcomputer 3.

The activation history flag and the system activation timer count may be stored in independent nonvolatile memories, respectively.

The soak timer 5, as described above, works to compare an instantaneous count value shown by the counter 36 upon activation of the ECU 1 by the soak timer 5 with the preset time and stop the counter 36 counting in order to retain the instantaneous count value as the timer-activated history record in itself, but may alternatively be designed to stop the counting in the counter 36 in response to a stop request signal inputted from outside the soak timer 5, e.g., from the microcomputer 3. In this case, the soak timer 5 may stop the counter 36 a preselected period of time after the input of the stop request signal. The microcomputer 3 may subsequently diagnose the soak timer 3. Specifically, if it is found that the counter 36 has not been stopped at the required time, the microcomputer 3 may determine that the soak timer 3 is malfunctioning.

The microcomputer 3 works to diagnose the evaporative purge system 100 upon activation of the ECU 1 by the soak timer 5, but may alternatively be designed to carry out a diagnosis task requiring stopping the engine E.

The microcomputer 3 uses the ignition switch 13 as a trigger for initiating the diagnosis of the soak timer 5, but may alternatively employ another type of switch provided to activate the ECU 1.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A vehicle electronic control apparatus comprising:

a microcomputer working to control a device mounted in a vehicle;

a first power supply circuit operable to supply operating power to said microcomputer in response to input of an on/off signal switchable between an on- and off-state, upon input of the on/off signal in the on-state, said first power supply circuit starting to supply the operating power, upon input of the on/off signal in the off-state, said first power supply circuit stops supplying the operating power;

a timer circuit including a register and a counter, the register storing therein a set value, the counter designed to star counting when the on/off signal is switched to the off-state, when a count value of said counter reaches the set value stored in said register, said timer circuit outputting a power supply on-signal to activate said first power supply circuit to supply the operating power to said microcomputer; and a second power supply circuit working to supply operating power to said timer circuit at all times, wherein when said first power supply circuit supplies the operating power to said microcomputer in response to the power supply on-signal outputted from said timer circuit, said microcomputer performing a given task and altering the set value as stored in the register of said timer circuit, and wherein said microcomputer alters the set value to outside a counting range of the counter to prohibit the power supply on-signal from being re-outputted; and when activated in responsive to subsequent input of the on/off signal of the on-state upon turning on of an ignition switch of a vehicle, said microcomputer makes a determination of whether the set value has been altered or not and diagnose the timer circuit based on a result of the determination.

2. A vehicle electronic control apparatus as set forth in claim 1, wherein the counter is designed to start counting when the on/off signal is switched to the off-state and stop counting when the count value reaches a given limit, and wherein said microcomputer alters the set value to outside the limit to prohibit the power supply on-signal from being re-outputted.

3. A vehicle electronic control apparatus as set forth in claim 1, wherein said timer circuit monitors the set value in the register to determine whether the set value has been altered by said microcomputer or not, and wherein if the set value is determined to have been altered, said timer circuit prohibits the power supply on-signal from being re-outputted.

4. A vehicle electronic control apparatus as set forth in claim 1, wherein when activated by supply of the operating power from said first power supply circuit upon the input of the on/off signal in the on-state, said microcomputer compares the count value read out of the counter with the set value read out of the register to determine whether said timer circuit is malfunctioning or not.

5. A vehicle electronic control apparatus as set forth in claim 4, wherein said microcomputer works to control an engine of the vehicle and also to diagnose a fuel vapor purge system as the given task.

* * * * *